United States Patent
Date et al.

(10) Patent No.: US 6,836,314 B2
(45) Date of Patent: Dec. 28, 2004

(54) OPTICAL DEVICE AND DISPLAY APPARATUS HAVING A PLATE-SHAPED LIGHT GUIDE AND AN OPTICAL CONTROL SURFACE THEREON

(75) Inventors: Munekazu Date, Sayama (JP); Shiro Suyama, Tokyo (JP); Kinya Kato, Kanazawa (JP); Kazutake Uehira, Tokorozawa (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 10/615,163

(22) Filed: Jul. 8, 2003

(65) Prior Publication Data

US 2004/0095524 A1 May 20, 2004

Related U.S. Application Data

(62) Division of application No. 09/361,856, filed on Jul. 27, 1999, now Pat. No. 6,618,104.

(30) Foreign Application Priority Data

| Jul. 28, 1998 | (JP) | 10-212780 |
| Sep. 2, 1998 | (JP) | 10-247871 |

(51) Int. Cl.$^7$ .............................. G02F 1/13; G02B 5/18
(52) U.S. Cl. ......................... 349/201; 349/63; 349/86; 349/113
(58) Field of Search ............................ 349/63, 86, 88, 349/110, 111, 113, 114, 201

(56) References Cited

U.S. PATENT DOCUMENTS

| 4,090,219 A | 5/1978 | Ernstoff et al. |
| 4,591,233 A | 5/1986 | Fergason |
| 4,606,611 A | 8/1986 | Fergason |

(List continued on next page.)

FOREIGN PATENT DOCUMENTS

| EP | 0 363 084 A2 | 4/1990 |
| EP | 0 643 318 A1 | 3/1995 |
| EP | 0 675 386 A1 | 10/1995 |
| EP | 0 729 055 A2 | 8/1996 |

(List continued on next page.)

OTHER PUBLICATIONS

World Intellectual Property Organization, Int'l Application No. PCT/US89/01446, Int'l Publication No. WO 89/09807, Int'l Publication Date Oct. 19, 1989.

Rumiko Yamaguchi, Yutaka Waki and Susumu Sato; Reverse Mode and Wide Viewing Angle Properties in Polymer Dispersed Liquid Crystal Cells Prepared Using a UV Curable Liquid Crystal; Jpn. J. Appl. Phys.; May 1997; pp. 2771–2774; vol. 36 (1997).

European Search Report, EP 99 30 5990, Completed Feb. 1, 2001.

*Primary Examiner*—Tarifur R. Chowdhury
*Assistant Examiner*—Andrew Schechter
(74) *Attorney, Agent, or Firm*—Alston & Bird LLP

(57) ABSTRACT

An optical device and a display apparatus of the present invention are constructed so as to improve display characteristics of output light intensity, display contrast, and reduction of scattered light due to external light, and also to provide a large-screen. The optical device has a first stacked body and a plurality of second stacked bodies. The first stacked body includes a light guide, a first electrode, and an optical control layer. The second stacked body includes a plurality of second electrodes, the reflection film and a substrate. There is an optical control layer which changes in scattering degree or diffraction efficiency by an electric field applied by said first electrode and said second electrode.

17 Claims, 23 Drawing Sheets

U.S. PATENT DOCUMENTS

| | | | |
|---|---|---|---|
| 4,626,074 A | | 12/1986 | Crossland et al. |
| 4,810,063 A | | 3/1989 | Fergason |
| 4,844,596 A | | 7/1989 | Fergason |
| 4,994,204 A | * | 2/1991 | Doane et al. ........... 252/299.01 |
| 5,299,289 A | | 3/1994 | Omae et al. |
| 5,434,690 A | | 7/1995 | Hisatake et al. |
| 5,452,385 A | | 9/1995 | Izumi et al. |
| 5,477,351 A | | 12/1995 | Takahara et al. |
| 5,581,380 A | * | 12/1996 | Bergman ..................... 349/63 |
| 5,648,860 A | | 7/1997 | Ooi et al. |
| 5,706,066 A | | 1/1998 | Sawayama et al. |
| 5,731,853 A | | 3/1998 | Taketomi et al. |
| 5,760,860 A | | 6/1998 | Mason et al. |
| 6,048,071 A | | 4/2000 | Sawayama |
| 6,091,463 A | | 7/2000 | Robinson et al. |
| 6,133,971 A | | 10/2000 | Silverstein et al. |
| 6,249,328 B1 | * | 6/2001 | Fukuzawa et al. ............ 349/70 |
| 6,339,463 B1 | | 1/2002 | Silverstein et al. |
| 6,373,540 B1 | | 4/2002 | Munakata |
| 6,618,104 B1 | | 9/2003 | Date et al. |

FOREIGN PATENT DOCUMENTS

| | | |
|---|---|---|
| EP | 0 823 587 A1 | 2/1998 |
| JP | 54-28597 | 3/1979 |
| JP | 59-178428 | 9/1984 |
| JP | 63-4515 | 1/1988 |
| JP | 01033520 A | 2/1989 |
| JP | 02101424 A | 4/1990 |
| JP | 3-23423 | 1/1991 |
| JP | 03073926 A | 3/1991 |
| JP | 4-97129 A | 3/1992 |
| JP | 04338721 A | 11/1992 |
| JP | 4-352129 A | 12/1992 |
| JP | 04355424 A | 12/1992 |
| JP | 5-5882 A | 1/1993 |
| JP | 05072509 A | 3/1993 |
| JP | 05080310 A | 4/1993 |
| JP | 05119302 A | 5/1993 |
| JP | 05173119 A | 7/1993 |
| JP | 5-281521 A | 10/1993 |
| JP | 06075218 A | 3/1994 |
| JP | 06214254 A | 8/1994 |
| JP | 06222360 A | 8/1994 |
| JP | 06250153 A | 9/1994 |
| JP | 6-258640 | 9/1994 |
| JP | 06289422 A | 10/1994 |
| JP | 06308471 A | 11/1994 |
| JP | 6-308543 | 11/1994 |
| JP | 6-347790 | 12/1994 |
| JP | 07056157 A | 3/1995 |
| JP | 07104322 A | 4/1995 |
| JP | 07306402 A | 11/1995 |
| JP | 09068700 A | 3/1997 |
| JP | 62-81688 | 4/1997 |
| JP | 10062798 A | 3/1998 |
| JP | 10078569 A | 3/1998 |
| JP | 10090708 A | 4/1998 |
| JP | 10090730 A | 4/1998 |
| JP | 10186361 A | 7/1998 |

* cited by examiner

OPTICAL DEVICE AND DISPLAY APPARATUS HAVING A PLATE-SHAPED LIGHT GUIDE AND AN OPTICAL CONTROL SURFACE THEREON

CROSS-REFERENCE TO RELATED APPLICATION(S)

This application is a divisional of U.S. Patent Application Ser. No. 09/361,856 filed Jul. 27, 1999 now U.S. Pat. No. 6,618,104, which, in turn, is based on Patent Application Nos. 212,780/1998 filed Jul. 28, 1998 in Japan and 247,871/1998 filed on Sep. 2, 1998 in Japan, the content of all of which is incorporated hereinto by reference.

BACKGROUND OF THE INVENTION

1. Filed of the Invention

The present invention relates to an optical device for electrically controlling retrieval of light in a light guide and a display apparatus using the optical device. The present invention further relates to a thin-structured, lightweight and large-screen display apparatus which is capable of preventing degradation of image and providing high-contrast display.

2. Description of the Prior Art

Recently, in research and development of a flat panel display to be display means of image information, demand is increasing for a large-area display apparatus which is ready for set-up and transportation. As prior art display apparatus, for example, a plasma display, a liquid-crystal display, and the like are known.

The plasma display is a display utilizing a light emission phenomenon in association with gas discharge, which is at present limited to about 50 inches in screen size. Further, since problems such as in weight, cost, productivity and the like occur with increasing screen size, there are still problems to be solved in general application as a large-screen display apparatus.

As to the liquid-crystal display, since its tin film transistor (TFT) drive board as a main component makes use of an advanced and fine semiconductor process, it is difficult to be large-sized. Further, the liquid-crystal display is driven from an end of the panel, there occurs a substantive problem of delaying signal propagation time in association with increasing screen size, that is, in construction of a large-area screen.

Further, there is known a projector using a liquid-crystal light bulb. An example thereof is shown in FIGS. 1A and 1B. FIG. 1A is a schematic sectional diagram showing a projector as a display apparatus using a liquid-crystal light bulb as an example of a prior art display apparatus, and FIG. 1B is a schematic sectional diagram showing the construction of the liquid-light bulb applied to the display apparatus.

The projector is constructed by arranging the light bulbs in an array to from a liquid crystal panel 10, illuminating the liquid-crystal panel 10 driven by a matrix electrode from the backside by an illumination 11, and focusing on a screen 13 by a lens 12.

Incident light from a light source(i.e., illumination 11) to the liquid-crystal panel 10 is linearly polarized by a polarizing plate 14, and applied to a twisted nematic(TN) liquid crystal cell 15.

When no electric field is applied to the liquid-crystal cell 15, the polarization direction is rotated by 90 degrees, but when applied with an electric field, the polarization direction is unchanged, and the light transmits, as is. Therefore, by selecting a polarization in a specific direction by a polarizing plate 16, light transmission or blocking can be electrically selected, thus providing a light bulb.

However, the projector of such a construction requires a depth for illuminating from the backside, which inevitably results in a large-sized apparatus.

As an alternative to the above-described plasma display, liquid-crystal display, and projector, the present invention proposes a display apparatus capable of providing a large screen, which uses a light guide and a liquid crystal. In this display apparatus, using a lightweight and inexpensive material as the light guide, and light propagating in the light guide can be retrieved to achieve a large-area screen which is lightweight, inexpensive, and thin-structured.

Here, as an example of prior art display apparatus using a light guide and a liquid crystal, a display apparatus disclosed in Japanese Patent Application Laying-open No. 6-308543(1994) will be described with reference to FIG. 2. This display apparatus comprises a light guide 21 having on the side surface thereof a light source 22 and a reflecting plate 23 for the light source, an electrode 25a provided on the lower surface of the light guide 21 through an electrode support substrate 26a, a ferroelectric liquid-crystal layer 24 provided on the lower surface of the electrode, an electrode 25b provided on the lower surface of the liquid-crystal layer 24, and a reflecting plate 27 provided under the electrode 25b through an electrode support substrate 26b. In this case, furthermore, a light-diffusing plate 28 is provided on the light guide 21.

With this construction, by light scattering of a disclination line appearing when applied with an AC electrical field in the vicinity of relaxation frequency of Goldstone mode of the liquid crystal, output light from the upper surface of the light guide can be adjusted to display an image. However, in the above invention, differing from a TN crystal or the like, application of an electric field by AC drive is essential. For this reason, there has been a disadvantage that passive matrix drive and active matrix drive such as TFT drive are difficult and bit-map display cannot be performed. Further, since directivity of scattering cannot be controlled, light intensity in the display direction (in general, normal direction to the display surface) is not enhanced. Still further, the invention does not describe ease of fabrication in large-screen construction nor signal delay.

Yet further, as examples of other prior art display apparatus, there are known display apparatuses disclosed in Japanese Patent Application Laying-open No. 6-347790 (1994), U.S. Pat. No. 4,626,074, Japanese Patent Application Laying-open No. 6-258640(1994)(U.S. Pat. No. 5,452,385) and the like.

Specifically, in the display apparatus disclosed in Japanese Patent Application Laying-open No. 6-347790(1994), light is guided in a display part and scattering and transmission state of the display part is controlled to make display, in which the display part uses a phase transition-type liquid crystal (not described in detail) or a conventional polymer dispersed liquid crystal. Here, the conventional polymer dispersed liquid crystal becomes a scattering state when no electric field is applied, and a transmission state when an electric field is applied. Since the conventional polymer dispersed liquid crystal has no directivity in its scattering state, light intensity in the display direction cannot be enhanced. Further, in its transmission state, it has a high transmissivity when viewed from the front direction, however, scattering is high when viewed from a small angle with respect to the display surface. Similarly, contrast is low when viewed from the side surface, as a result, scattering state and transmission state may reverse. Still further, when matrix drive is performed, since the spacing between electrodes always shows scattering, display of black is difficult, resulting in a very low contrast display screen. In the specification of the above invention, any of ease of fabrication of large-area construction and signal delay is not described.

The specification of U.S. Pat. No. 4,626,074 discloses a display screen using light scattering by liquid-crystal layer. However, in this case, since diffraction is not used, the output direction cannot be controlled. Still further, in the display apparatus according to the invention, a gap is required on the backside surface, and problems of divisional drive in the large-area construction, ease of fabrication, signal delay and the like are still unsolved, which makes it difficult to achieve a large-area construction.

Since any of the above-described technologies on prior art display apparatus controls display by scattering and transmission, the display screen is illuminated by an illumination at the side of a person looking the display apparatus. As a result, scattered light overlaps with the display image, the display image is affected not only by the color of the light source but also by ambient illumination light, which degrades the display image and makes color display difficult.

Yet further, Japanese Patent Application Laying-open No. 6-258640(1994) (corresponding to U.S. Pat. No. 5,452,385) discloses a display apparatus in which light propagating in the light guide is taken out by utilizing diffraction, and shuttering is effected by liquid crystal. However, in the display apparatus according to disclosed in such a document, since its diffraction grating is always in a diffraction state, diffraction efficiency cannot be varied. Therefore, there is a problem in that light always leaks from the light guide, resulting in a reduction of light utilization efficiency.

That is, there have been required for prior art optical display device and optical display apparatus to provide improved display characteristics such as increase in output light intensity, improvement of display contrast, and reduction of scattered light due to external light as well as ease of fabrication of large-area screen.

SUMMARY OF THE INVENTION

Objects of the present invention are as follows.

(1) Using a plate of a structure capable of guiding light and a refractive index-variable thin film, an object of the present invention is to provide an optical device for controlling retrieval of light and a display apparatus using the optical device.

(2) Using a plate of a structure capable of guiding light and a thin film capable of producing a scattering ability by an electric field, another object of the present invention is to provide an optical device for controlling retrieval of light and a display apparatus using the optical device.

(3) Using a plate of a structure capable of guiding light and a diffraction efficiency-variable thin film, a still further object of the present invention is to provide an optical device for controlling retrieval of light and a display apparatus using the optical device.

(4) Driving a plate of a structure capable of guiding light and a thin film by an electrode capable of making mirror reflection, a yet further object of the present invention is to provide an optical device for driving directly from the backside of the thin film and a display apparatus using the optical device.

(5) Using a polymer dispersed liquid crystal in an optical control layer, a yet further object of the present invention is to provide an optical device for controlling scattering or transmission or controlling diffraction efficiency and a display apparatus using the optical device.

(6) Using a reverse-mode polymer dispersed liquid crystal in an optical control layer, a yet further object of the present invention is to provide an optical device for making a gap between electrodes when making matrix driving by strip-shaped electrodes and preventing degradation of display image due to the gap of electrodes and a display apparatus using the optical device.

(7) Applying light from an end surface of a light guide and matrix driving a thin film, a yet further object of the present invention is to provide an optical device for achieving a display apparatus and a display apparatus using the optical device.

(8) Providing a reflection film, since light propagating in a light guide is reflected before reaching electrodes, a yet further object of the present invention is to provide an optical device for preventing light absorption by the electrodes and optical loss by electrode ends and a display apparatus using the optical device. In this case, the reflection film may be a dielectric multilayered film or a film lower in refractive index than said light guide.

(9) In particular, since, when using the dielectric multilayered film (or the film with a low refractive index), there is no electroconductivity, a yet further object of the present invention is to provide an optical device for reflecting without disarranging a driving electric field. Further, by a reflection characteristic having a directional selectivity, a yet further object of the present invention is to provide an optical device for reflecting only light being guided and a display apparatus using the optical device.

(10) When using a reflection film having a directional selectivity in reflection like a multilayered film by disposing a light-absorption film between electrodes and reflection film, a yet further object of the present invention is to provide an optical device for preventing visibility of the reflection film and electrodes from the side of viewing the device and a display apparatus using the optical device.

(11) A yet further object of the present invention is to provide an optical device for achieving a high-contrast, thin-structured, and lightweight large-screen display apparatus and a display apparatus using the optical device.

In a first aspect of the present invention, there is provided an optical device comprising a light transmissive plate-shaped light guide for guiding light incident from an end surface, an optical control layer provided on a lower surface of the plate-shaped light guide through a transparent electrode provided as a first electrode, and a reflection plate provided on a lower surface of the optical control layer through a transparent electrode provided as a second electrode, wherein the optical control layer changes in refractive index by an electric field applied by the first electrode and the second electrode, shows a refractive index substantially same as or greater than that of the plate-shaped light guide when no electric field is applied and shows a small refractive index as compared with the plate-shaped light guide when an electric field is applied, and the reflection plate is made of a light transmissive material, a reflection surface of the reflection plate is angled at a predetermined angle with respect to a surface thereof on the optical control layer side, and a reflection film is formed on the reflection surface.

In a second aspect of the present invention, there is provided an optical device comprising a light transmissive plate-shaped light guide for guiding light incident from an end surface, an optical control layer provided on a lower surface of the plate-shaped light guide through a transparent electrode provided as a first electrode, and a reflection plate made of a light transmissive plate provided on a lower surface of the optical control layer through a second electrode comprising the transparent electrode, wherein the optical control layer is made of a reverse mode polymer dispersed liquid crystal changing in scattering degree by an electric field applied by the first electrode and the second electrode, which is constructed by dispersing a low molecular-weight liquid crystal in a liquid crystalline polymer, and the optical control layer becomes a uniform birefringent thin film when no electric field is applied and becomes a scattering state when an electric field is applied.

In a third aspect of the present invention, there is provided an optical device comprising a light transmissive plate-shaped light guide for guiding light incident from an end surface, an optical control layer provided on a lower surface of the plate-shaped light guide through a transparent electrode provided as a first electrode, and a reflection plate made of a light transmissive plate provided on a lower surface of the optical control layer through a transparent electrode provided as a second electrode, wherein the optical control layer changes in diffraction ability by an electric field applied by the first electrode and the second electrode.

In a fourth aspect of the present invention, there is provided an optical device comprising a light transmissive plate-shaped light guide for guiding light incident from an end surface, an optical control layer provided on a lower surface of the plate-shaped light guide through a transparent electrode provided as a first electrode, a second electrode provided on a lower surface of the optical control layer, and a substrate provided on a lower surface of the second electrode, wherein at least one of the first electrode and the second electrode has a periodic structure for inducing a fine periodic structure for light diffraction in the optical control layer, and the optical control layer changes in refractive index or absorptivity or scattering degree by an electric field applied by the first electrode and the second electrode.

In a fifth aspect of the present invention, there is provided an optical device comprising a light transmissive plate-shaped light guide for guiding light incident from an end surface, an optical control layer provided on a lower surface of the plate-shaped light guide, periodic electrodes having periodic structures disposed in alternation and provided on a lower surface of the optical control layer for inducing a fine periodic structure for light diffraction in the optical control layer, and a substrate provided on a lower surface of the periodic electrodes disposed in alternation, wherein the optical control layer changes in refractive index or absorptivity or scattering degree by an electric field applied by the periodic electrodes disposed in alternation.

In a sixth aspect of the present invention, there is provided a display apparatus comprising an optical device and a illumination means for applying light to the optical device, wherein the optical device has an end surface for incident light from the illumination means, a light transmissive plate-shaped light guide for guiding incident light, an optical control layer provided on a lower surface of the plate-shaped light guide, and a reflection plate made of a light transmissive plate provided on a lower surface of the optical control layer through a transparent electrode provided as a second electrode, wherein the optical control layer is made of a reverse mode polymer dispersed liquid crystal changing in scattering degree by an electric field applied by the first electrode and the second electrode, which is constructed by dispersing a low molecular-weight liquid crystal in a liquid crystalline polymer, and the optical control layer becomes a uniform birefringent thin film when no electric field is applied and becomes a scattering state when an electric field is applied.

In a seventh aspect of the present invention, there is provided a display apparatus comprising an optical device and a illumination means for applying light to the optical device, wherein the optical device has an end surface for incident light from the illumination means, a light transmissive plate-shaped light guide for guiding incident light, an optical control layer provided on a lower surface of the plate-shaped light guide through a transparent electrode provided as a first electrode, and a second electrode provided as an electrode on a lower surface of the optical control layer for making mirror reflection of light, wherein the optical control layer is made of a reverse mode polymer dispersed liquid crystal changing in scattering degree by an electric field applied by the first electrode and the second electrode, which is constructed by dispersing a low molecular-weight liquid crystal in a liquid crystalline polymer, and the optical control layer becomes a uniform birefringent thin film when no electric field is applied and becomes a scattering state when an electric field is applied.

In an eighth aspect of the present invention, there is provided a display apparatus comprising an optical device and a illumination means for applying light to the optical device, wherein the optical device has an end surface for incident light from the illumination means, a light transmissive plate-shaped light guide for guiding incident light, an optical control layer provided on a lower surface of the plate-shaped light guide, and a reflection plate made of a light transmissive plate provided on a lower surface of the optical control layer through a transparent electrode provided as a second electrode, wherein the optical control layer changes in diffraction ability by an electric field applied by the first electrode and the second electrode.

In a ninth aspect of the present invention, there is provided a display apparatus comprising an optical device and a illumination means for applying light to the optical device, the optical device has an end surface for incident light from the illumination means, a light transmissive plate-shaped light guide for guiding incident light, an optical control layer provided on a lower surface of the plate-shaped light guide through a transparent electrode provided as a first electrode, and a second electrode provided as an electrode on a lower surface of the optical control layer for making mirror reflection of light, wherein the optical control layer changes in diffraction ability by an electric field applied by the first electrode and the second electrode.

In a tenth aspect of the present invention, there is provided a display apparatus comprising an optical device and a illumination means for applying light to the optical device;

the optical device having an end surface for incident light from the illumination means, a light transmissive plate-shaped light guide for guiding incident light, an optical control layer provided on a lower surface of the plate-shaped light guide through a transparent electrode provided as a first electrode, a periodic electrode provided as a second electrode having a periodic structure provided on a lower surface of the optical control layer for inducing a fine periodic structure for light diffraction in the optical control layer, and a substrate provided on a lower surface of the second electrode, wherein at least one of the first electrode and the second electrode has a periodic structure for inducing a fine periodic structure for light diffraction in the optical control layer, and the optical control layer changes in refractive index or absorptivity or scattering degree by an applied electric field, and is made of a reverse mode polymer dispersed liquid crystal changing in refractive index or absorptivity or scattering degree by an electric field applied by the first electrode and the second electrode, which is constructed by dispersing a low molecular-weight liquid crystal in a liquid crystalline polymer, and the optical control layer becomes a uniform birefringent thin film when no electric field is applied and becomes a scattering state when an electric field is applied.

In an eleventh aspect of the present invention, there is provided a display apparatus comprising an optical device and a illumination means for applying light to the optical device;

the optical device having an end surface for incident light from the illumination means, a light transmissive plate-shaped light guide for guiding incident light, an optical control layer provided on a lower surface of the plate-shaped light guide through a transparent electrode provided as a first electrode, a second electrode provided on a lower surface of the optical control layer and comprising an electrode divided into a plurality of units, and a plurality of third electrodes corresponding one to one to each of the plurality of divided second electrodes and penetrating through the substrate, wherein the optical control layer changes in refractive index or absorptivity or scattering degree or diffraction ability by an electric field applied by the first electrode and the second electrode, each of the plurality of third electrodes has a first end part connecting to the second electrode and a second end part exposed to a surface opposite to the second electrode side of the substrate, and the respective electrodes are capable of being applied with a voltage from the substrate side discretely or dividedly in an optional number of groups.

In a twelfth aspect of the present invention, there is provided a display apparatus comprising an optical device and a illumination means for applying light to the optical device;

the optical device having an end surface for incident light from the illumination means, a light transmissive plate-shaped light guide for guiding incident light, a first stacked body integrated with an optical control layer provided on a lower surface of the plate-shaped light guide through a transparent electrode provided as a first electrode, and a second stacked body integrated with each of substrate divided into a plurality of units, wherein the second stacked body corresponds one to one to each of the second electrode divided into a plurality of units and a substrate provided on a lower surface of the second electrode and the plurality of divided second electrodes, has a plurality of third electrodes penetrating through the substrate, and arranged on a lower surface of the optical control layer, the optical control layer changes in refractive index or absorptivity or scattering degree or diffraction ability by an electric field applied by the first electrode and the second electrode, each of the plurality of third electrodes has a first end part connecting to the second electrode and a second end part exposed to a surface opposite to the second electrode side of the substrate, and the respective electrodes are capable of being applied with a voltage from the substrate side discretely or dividedly in an optional number of groups.

In a thirteenth aspect of the present invention, there is provided an optical device comprising a light transmissive plate-shaped light guide for guiding light incident from an end surface, an optical control layer provided on a lower surface of the plate-shaped light guide through a transparent electrode provided as a first electrode, a reflection film provided on a lower surface of the optical control layer, a second electrode provided on a lower surface of the reflection film, and a substrate provided on a lower surface of the second electrode, wherein the optical control layer changes in scattering degree or diffraction efficiency by an electric field applied by the first electrode and the second electrode, In a fourteenth aspect of the present invention, there is provided an optical device comprising a light transmissive plate-shaped light guide for guiding light incident from an end surface, an optical control layer provided on a lower surface of the plate-shaped light guide through a transparent electrode provided as a first electrode, a reflection film provided on a lower surface of the optical control layer, a second electrode provided on a lower surface of the reflection film, and a substrate provided on a lower surface of the second electrode, wherein at least one of the first electrode and the second electrode has a periodic structure for inducing a fine periodic structure for light diffraction in the optical control layer, and the optical control layer changes in refractive index or scattering degree or absorbance by an electric field applied by the first electrode and the second electrode.

In a fifteenth aspect of the present invention, there is provided an optical device comprising a light transmissive plate-shaped light guide for guiding light incident from an end surface, an optical control layer provided on a lower surface of the plate-shaped light guide, a reflection film provided on a lower surface of the optical control layer, an electrode comprising periodic electrodes having periodic structures disposed in alternation and provided on a lower surface of the reflection film for inducing a fine periodic structure for light diffraction in the optical control layer, and a substrate provided on a lower surface of the electrode having periodic electrodes disposed in alternation.

wherein the optical control layer changes in refractive index or scattering degree or absorbance by an electric field applied by the electrode having periodic electrodes disposed in alternation.

In a sixteenth aspect of the present invention, there is provided a display apparatus comprising an optical device and a illumination means for applying light to the optical device, the optical device having an end surface for incident light from the illumination means, a light transmissive plate-shaped light guide for guiding incident light, an optical control layer provided on a lower surface of the light guide through a transparent electrode provided as a first electrode, a reflection film provided on a lower surface of the optical control layer, a second electrode provided on a lower surface of the reflection film, and a substrate provided on a lower surface of the second electrode, wherein the optical control layer changes in scattering degree or diffraction efficiency by an electric field applied by the first electrode and the second electrode.

In a seventeenth aspect of the present invention, there is provided a display apparatus comprising an optical device and a illumination means for applying light to the optical device, the optical device having an end surface for incident light from the illumination means, a light transmissive plate-shaped light guide for guiding incident light, an optical control layer provided on a lower surface of the light guide through a transparent electrode provided as a first electrode, a reflection film provided on a lower surface of the optical control layer, a second electrode provided on a lower surface of the reflection film, and a substrate provided on a lower surface of the second electrode, wherein at least one of the first electrode and the second electrode has a periodic structure for inducing a fine periodic structure for light diffraction in the optical control layer, and the optical control layer changes in refractive index or scattering degree or absorbance by an electric field applied by the first electrode and the second electrode.

In an eighteenth aspect of the present invention, there is provided a display apparatus comprising: an optical device, a illumination means for applying light to the optical device, the optical device having an end surface for incident light from the illumination means, a light transmissive plate-shaped light guide for guiding incident light, an optical control layer provided on a lower surface of the plate-shaped light guide through a transparent electrode provided as a first electrode, a reflection film provided on a lower surface of the optical control layer, a second electrode comprising an electrode divided into a plurality of units provided on a lower surface of the reflection film, a substrate provided on a lower surface of the second electrode, and a plurality of third electrodes corresponding one to one to each of the plurality of second electrode, penetrating through the substrate, wherein the optical control layer changes in refractive index or absorptivity or scattering degree or diffraction ability by an electric field applied by the first electrode and the second electrode, each of the plurality of third electrodes has a first end part connecting to the second electrode and a second end part exposed to a surface opposite to the second electrode side of the substrate, and the respective electrodes are capable of being applied with a voltage from the substrate side discretely or dividedly in an optional number of groups.

In a nineteenth aspect of the present invention, there is provided a display apparatus comprising: an optical device, a illumination means for applying light to the optical device, the optical device having an end surface for incident light from the illumination means, a light transmissive plate-shaped light guide for guiding incident light, a first stacked body integrated with an optical control layer provided on a lower surface of the plate-shaped light guide through a transparent electrode provided as a first electrode, and a second stacked body integrated with each of substrate divided into a plurality of units, wherein the second stacked body has a reflection film, a second electrode divided into a plurality of units provided on a lower surface of the reflection film, a substrate provided on a lower surface of the plurality of divided second electrodes, and a plurality of third electrodes corresponding one to one to each of the plurality of divided second electrodes, penetrating through the substrate, and arranged on a lower surface of the optical control layer, the optical control layer changes in refractive index or absorptivity or scattering degree or diffraction ability by an electric field applied by the first electrode and the second electrode, each of the plurality of third electrodes has a first end part connecting to the second electrode and a second end part exposed to a surface opposite to the second electrode side of the substrate, and the respective electrodes are capable of being applied with a voltage from the substrate side discretely or dividedly in an optional number of groups.

The above and other objects, effects, features and advantages of the present invention will become more apparent from the following description of the embodiments thereof taken in conjunction with the accompanying drawings.

BRIEF DESCRIPTION OF THE DRAWINGS

FIGS. 1A and 1B are schematic illustrations showing an example of prior art display apparatus, in which FIG. 1A is a sectional diagram showing a schematic construction of a projector, and FIG. 1B is a sectional diagram showing a schematic construction of a liquid-crystal light bulb used in a display apparatus;

FIGS. 3A and 3B are side sectional illustrations schematically showing an embodiment of angled reflection surface type optical device according to the present invention, in which FIG. 3A shows a state where no electric field is applied to an optical control layer, and FIG. 3B shows a state where an electric field is applied to the optical control layer;

FIGS. 5A and 5B are side sectional diagrams schematically showing an embodiment of parallel reflection surface type optical device according to the present invention, in which FIG. 5A shows a state where no electric field is applied to an optical control layer, and FIG. 5B shows a state where an electric field is applied to the optical control layer;

FIGS. 6A and 6B are side sectional diagrams schematically showing an embodiment of parallel reflection surface type optical device according to the present invention, in which FIG. 6A shows a state where no electric field is applied to an optical control layer, and FIG. 6B shows a state where an electric field is applied to the optical control layer;

FIGS. 8A and 8B are side sectional diagrams schematically showing an embodiment of parallel reflection surface type optical device according to the present invention, in which FIG. 8A shows a state where no electric field is applied to an optical control layer, and FIG. 8B shows a state where an electric field is applied to the optical control layer;

FIGS. 9A and 9B are diagrams schematically showing an embodiment of parallel reflection surface type optical device according to the present invention, in which FIG. 9A is a side sectional diagram of the optical device, and FIG. 9B is a plane diagram showing a comb-shaped electrode which is formed on a substrate;

FIGS. 10A and 10B are diagrams schematically showing an embodiment of parallel reflection surface type optical device according to the present invention, in which FIG. 10A is a side sectional diagram of the optical device, and FIG. 10B is a plane diagram showing a comb-shaped electrode which is formed on a substrate;

FIGS. 11A, 11B and 11C show an example of display apparatus according to the present invention, in which FIG. 11A is a plane diagram, FIG. 11B is a sectional diagram taken along line A–A' in FIG. 11A, and FIG. 11C is a plane diagram of another electrode applied to FIG. 11B;

FIGS. 12A, 12B and 12C show an example of display apparatus according to the present invention, in which FIG. 12A is a side sectional diagram of the display apparatus, FIG. 12B is a plane diagram showing a comb-shaped electrode divided into display pixel units, and FIG. 12C is a plane diagram showing a comb-shaped electrode provided on a transparent electrode divided into display pixel units and over the entire surface of the display area;

FIGS. 13A, 13B and 13C show an example of display apparatus according to the present invention, in which FIG. 13A is a side sectional diagram of the display apparatus, FIG. 13B is a plane diagram showing a comb-shaped electrode divided into display pixel units, and FIG. 13C is a plane diagram showing a comb-shaped electrode divided into display pixel units;

FIGS. 15A and 15B are side sectional diagrams schematically showing an embodiment of parallel reflection surface type optical device according to the present invention, in which FIG. 15A shows a case where the optical control layer is in a transmission state, and FIG. 15B shows a case where the optical control layer is in a scattering state;

FIGS. 16A and 16B are side sectional diagrams schematically showing an embodiment of parallel reflection surface type optical device according to the present invention, in which FIG. 16A shows a case where the optical control layer is in a transmission state, and FIG. 16B shows a case where the optical control layer is in a scattering state;

FIGS. 18A and 18B are diagrams schematically showing an embodiment of parallel reflection surface type optical device according to the present invention, in which FIG. 18A is a side sectional diagram of the optical device, and FIG. 18B is a plane diagram showing a comb-shaped electrode which is formed on a substrate;

FIGS. 19A and 19B are diagrams schematically showing an embodiment of parallel reflection surface type optical device according to the present invention, in which FIG. 19A is a plane diagram showing a comb-shaped electrode which is formed on a substrate, and FIG. 19B is a side sectional diagram of the optical device;

FIGS. 20A and 20B show an example of display apparatus according to the present invention, in which FIG. 20A is a plane diagram, and FIG. 20B is a sectional diagram taken along line A–A' in FIG. 20A;

DETAILED DESCRIPTION OF PREFERRED EMBODIMENTS

In the following, the present invention along with embodiments thereof will be described in detail with reference to the drawings.

(Embodiment 1)

Figure 1A:
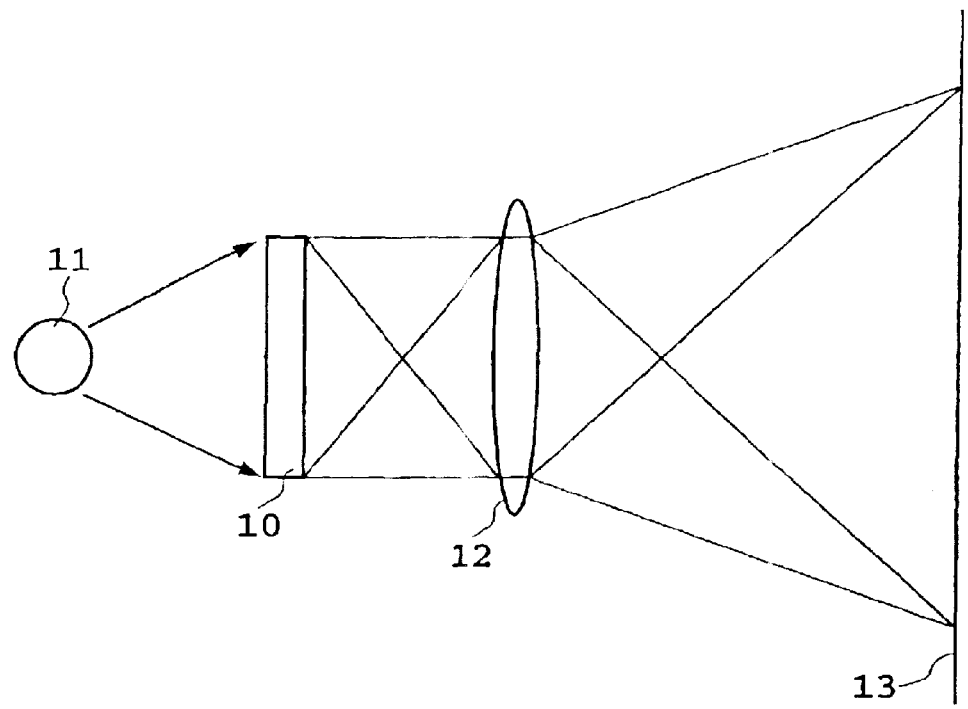
Figure 1B:
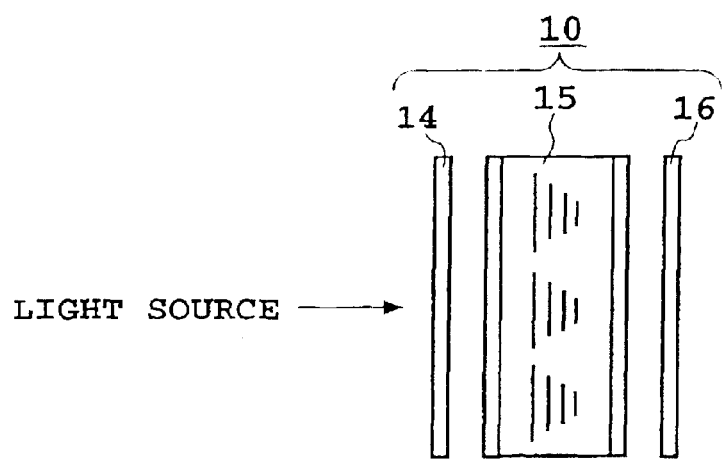
Figure 2:
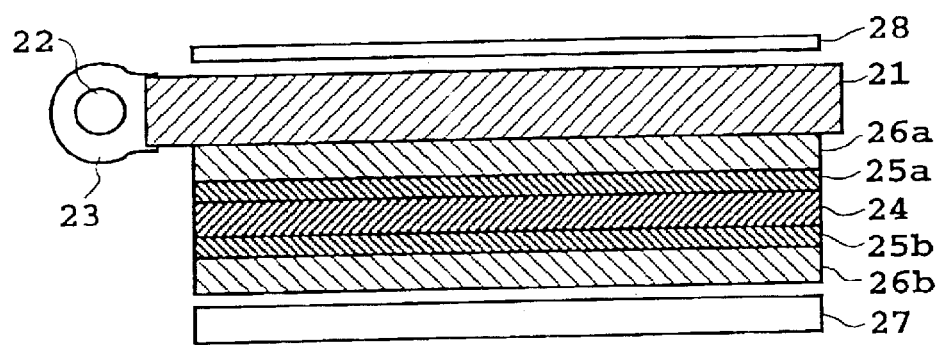
FIG. 2 is a schematic sectional diagram showing an example of prior art display apparatus.
Figure 3A:
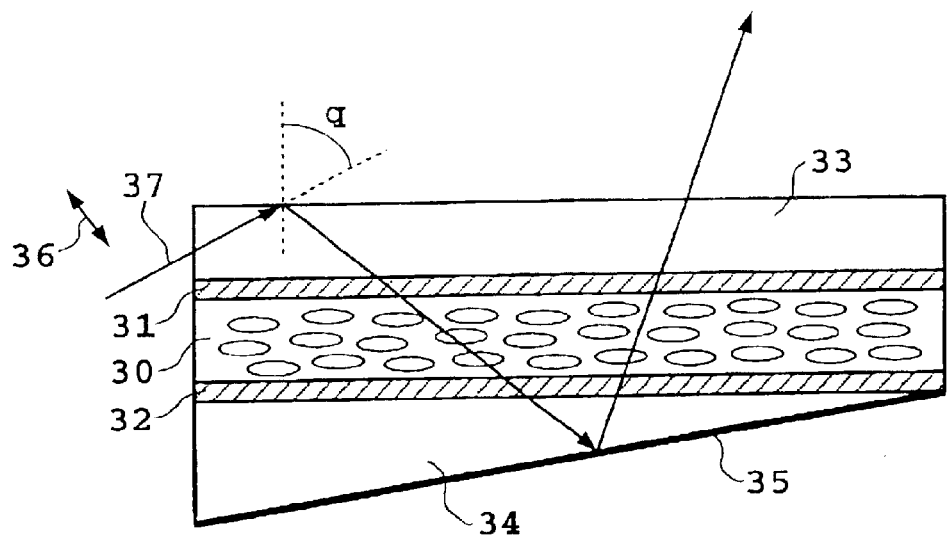
Figure 3B:
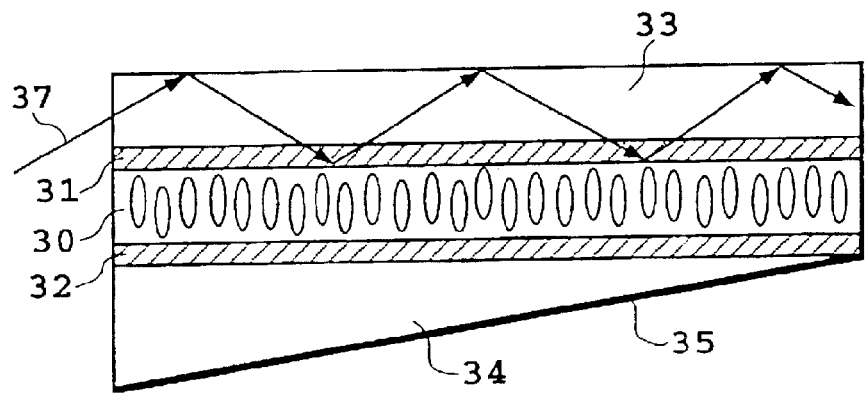

FIGS. 3A and 3B are side sectional illustrations schematically showing an embodiment of angled reflection surface type optical device according to the present invention, in which FIG. 3A shows a state where no electric field is applied to an optical control layer, and FIG. 3B shows a state where an electric field is applied to the optical control layer.

The optical device comprises an optical control layer 30; a transparent electrode 31, 32 which are provided to sandwich the optical control layer 30; a light guide 33 stacked on the transparent electrode 31; and a reflection plate 34 provided on the lower surface of the transparent electrode 32. The reflection plate 34 has an angled reflection surface 35 at the opposite side to the surface contacting the transparent electrode 32. Elliptical patterns in the optical control layer indicate the direction of liquid crystal alignment in the optical control layer.

The reflection surface 35 is angled by a predetermined angle with respect to the optical control layer 30, so that a total reflection does not take place when incident light is reflected on the reflection surface and outputted as reflected light.

In the following, the optical device of the present embodiment will be described in further detail.

The optical device uses, as the light guide 33, a plate comprising a high refractive index optical glass such as SFS01 (from Schott) which is easy to guide light, which is provided with the transparent electrode 31 such as indium tin oxide, the transparent electrode 32 such as indium tin oxide is provided on one surface of wedge-shaped conventional optical glass such as BK7 (from Schott) and a reflection film such as aluminum is provided on the other surface (reflection surface 35), the resulting assembly is used as the reflection plate 34. In this case, the reflection plate 34 and the liquid-crystal layer 30 may have no difference in refractive index therebetween.

After the surface of the transparent electrodes 31 and 32 is alignment processed by way of alignment layer, rubbing or the like, a nematic liquid crystal such as E-7 (from Merck Japan) is inserted as the liquid-crystal layer 30 between the electrodes, thereby easily achieving the optical device.

As shown in FIG. 3A, when no electric field is applied, liquid crystal of the liquid-crystal layer 30 is aligned in parallel to the transparent electrodes 31 and 32. This allows polarized light to be incident in the in-plane direction 36 including the liquid crystal alignment. The incident light 37 is total-reflected at the interface of the light guide 33 and air, however, at the interface of the transparent electrode 31 and the liquid-crystal layer 30, refracted to transmit, and reflected by the reflection surface 35. The reflection surface 35 is angled by a predetermined angle relative to the liquid crystal layer 30. Since the light reflected from the angled reflection surface is incident to the interface of the light guide 33 and air at an acute angle differing from light propagating in the light guide 33, the light does not satisfy the total reflection condition, and is thus outputted to the outside. That is, the optical device is in a light emitting state.

The predetermined angle is an angle to incline the reflected light to an extent that light reflected from the reflection surface 35 is out of the total reflection condition on the inside of the surface of the light guide 33. Although this inclination angle depends on refractive index of the reflection plate and output direction, it can be unitarily determined if these physical characteristics are determined at the time of designing the optical display device.

Next, as shown in FIG. 3B, when an electric field is applied to the liquid-crystal layer 30, alignment direction of liquid crystal becomes parallel to the electric field, and refractive index to light is decreased. Therefore, light reflected at the interface of the light guide 33 and air satisfies the total reflection condition also at the interface of the transparent electrode 31 and the liquid-crystal layer 30 and is thus reflected. As a result, light is confined inside the light guide 33. As described above, a light bulb can be achieved which is capable of controlling light intensity by way of electric field.

(Embodiment 2)

Figure 4:
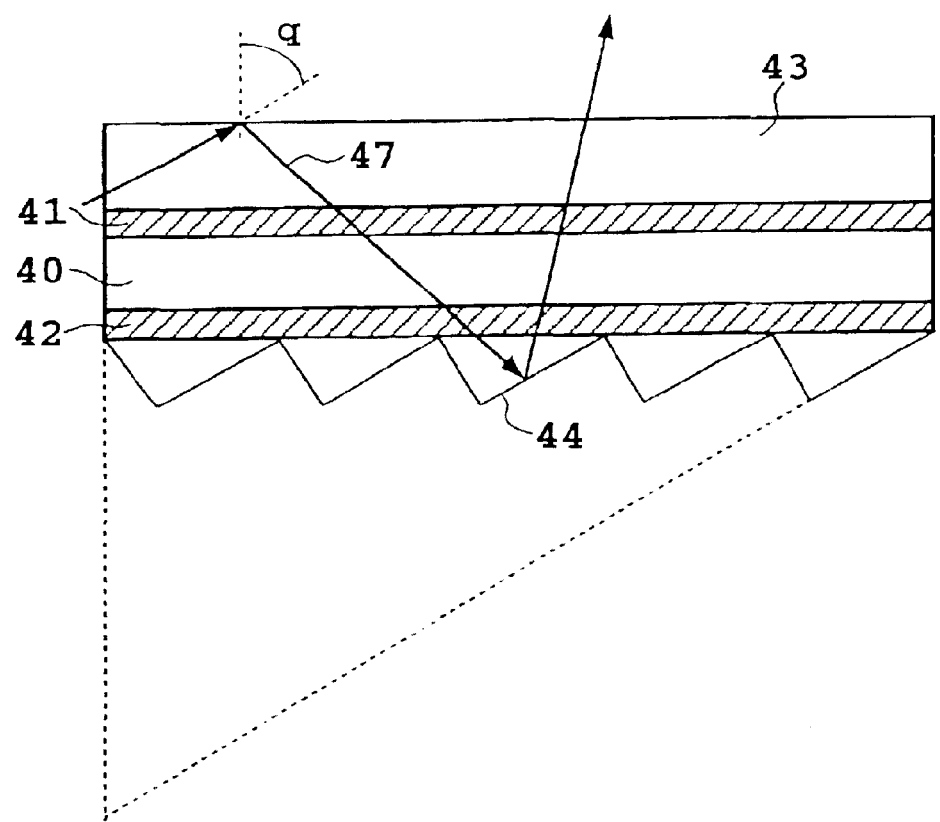
FIG. 4 is a side sectional diagram schematically showing another embodiment of angled reflection surface type optical device according to the present invention, showing a state where no electric field is applied to an optical control layer.

FIG. 4 is a side sectional diagram schematically showing another embodiment of angled reflection surface type optical device according to the present invention, showing a state where no electric field is applied to an optical control layer. Construction of the optical device is the same as in Embodiment 1 except that the inclined surface of the reflection plate 44 is sawtooth cross-sectioned (inclined surface group comprising a plurality of inclined surfaces). That is, the optical device comprises an optical control layer 40, a transparent electrode 41 and a transparent electrode 42 provided to sandwich the optical control layer 40, a light guide 43 stacked on the transparent electrode 41, and a reflection plate 44 provided on the lower surface of the transparent electrode 42. However, by making the reflection plate 44 to be a sawtooth cross-sectioned inclined surface, the thickness of the reflection plate can be remarkably reduced as compared with that of Embodiment 1. In FIG. 4, the broken lines indicate the shape of reflection plate of an optical device of the construction of Embodiment 1 which performs the same operation, also when it is divided into an angled surface group, each angled surface has the same inclination angle as in the construction of Embodiment 1.

Further, each angled surface is angled by a predetermined angle so that a total reflection does not take place when incident light 47 is reflected on the reflection surface and outputted as reflected light. Here, the predetermined angle, as described in Embodiment 1, is unitarily determined if various physical characteristics are determined.

In general, a single-axis birefringent medium such as liquid crystal has a refractive index differing by polarized light, that is, an extraordinary refractive index or an ordinary refractive index. Here, the "extraordinary refractive index" means a refractive index to light polarized in the optical axis direction of a single-axis birefringent medium. The "ordinary refractive index" means a refractive index to light polarized in a direction perpendicular to the optical axis of the single-axis birefringent medium.

Refractive index of material in the operation of the optical device of Embodiment 1 and Embodiment 2 is required to satisfy the two conditions of the following formulae ((1) and (2)), where an ordinary refractive index of liquid crystal is "no", an extraordinary refractive index is "ne", a refractive index of light guide is "ng", and an incident angle to the interface is q.

$$\sin(q) < (ne/ng) \quad (1)$$

$$\sin(q) > (no/ng) \quad (2)$$

By polishing the entire end surfaces of the light guide into smooth surfaces and further providing reflection films to the end surfaces except for the light incident part, light confinement characteristic in the light guide can be improved. Here, the "end surface" means a surface which is not parallel to the interface of the light guide and the optical control layer.

Further, since scattering does not occur in the liquid-crystal layer in Embodiment 1 and Embodiment 2, it is possible to achieve a display device in which display image is not degraded due to illumination of the user's room, and a thin-structured, matrix-driven display apparatus by using the optical devices comprising these constructions.

Next, prior to describing an embodiment characterized by using a reverse mode polymer dispersed liquid crystal (hereinafter referred to as reverse mode PDLC) in the optical control layer, differences between a conventional PDLC and a reverse mode PDLC will be described.

A conventional PDLC is constructed by dispersing LC droplets in an isotropic polymer film, which LC droplets having a nearly equal single axis direction refractive index (ordinary refractive index) to a minor axis direction refractive index of the polymer forming the film. In the conventional PDLC, when no electric field is applied, liquid crystal molecules in the LC droplet are directed in random directions for each LC droplet, a refractive index difference occurs between the LC droplet and ambient polymer, thus providing a scattering state. On the other hand, when an electric field is applied, since liquid crystal molecules are aligned in parallel to the electric field, there is no difference in refractive index between the LC droplet and ambient polymer, thus providing a transmission state.

When a light emitting device is constructed using such a conventional PDLC and illuminated with light in a direction parallel to an electric field, the device is in a light emitting state by scattering when no electric field is applied, and a non-light emitting state when an electric field is applied. However, when illuminated with light in a direction nearly perpendicular to the electric field, since the light is applied in a direction nearly perpendicular to the optical axis of the liquid crystal molecule, a refractive index difference between the LC droplet and ambient polymer still remains, and a light emitting state results when viewed from a diagonal direction other than parallel to an electric field. That is, when the liquid crystal is viewed from an oblique direction, the liquid crystal causes scattering to become light emitting state regardless of electric field application. Therefore, if such a liquid crystal is applied to a display apparatus, viewing angle characteristic will be deteriorated.

On the other hand, a reverse mode PDLC is constructed by dispersing a low-molecular weight liquid crystal in a liquid-crystalline polymer. In this reverse mode PDLC, when no electric field is applied to the liquid crystal, the liquid-crystalline polymer and the low-molecular weight liquid crystal form a uniform film having a birefringence, resulting in a transmission state. Further, when an electric field is applied, the low-molecular weight liquid crystal is aligned by the electric field to produce a refractive index difference relative to the liquid-crystalline polymer, resulting in a scattering state.

When a light emitting device is constructed using such a reverse mode PDLC, in a transmission state, uniform refractive index distribution is obtained to light in all directions. Therefore, when such a liquid crystal is applied to a display apparatus, since no light emission in any direction occurs in the transmission state, a high-contrast display is possible even from a diagonal direction. Further, a scattering state of a light emitting device using a reverse mode PDLC is characterized in that scattering is strong in a plane including the alignment direction. In general, viewing position of the user is often moved in the right and left direction, rather than in the upward and downward directions, when such a device is applied to the display screen, by aligning in the right and left directions, directivity in the right and left directions can be widened, and directivity in the upward and downward directions be narrowed, thereby achieving an efficient, easy viewing display.

Further, by setting the initial alignment perpendicular to the electrode, and using a liquid crystal having a negative dielectric anisotropy as the low molecular weight liquid-crystal. an isotropic display can be achieved.

(Embodiment 3)

Figure 5A:
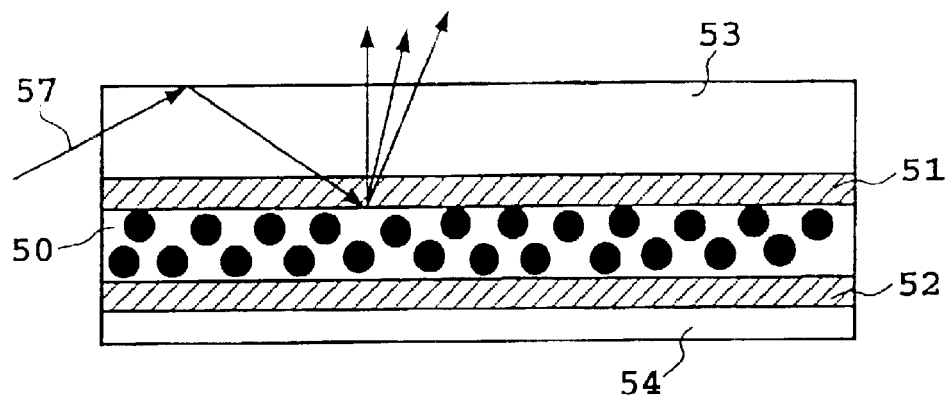
Figure 5B:
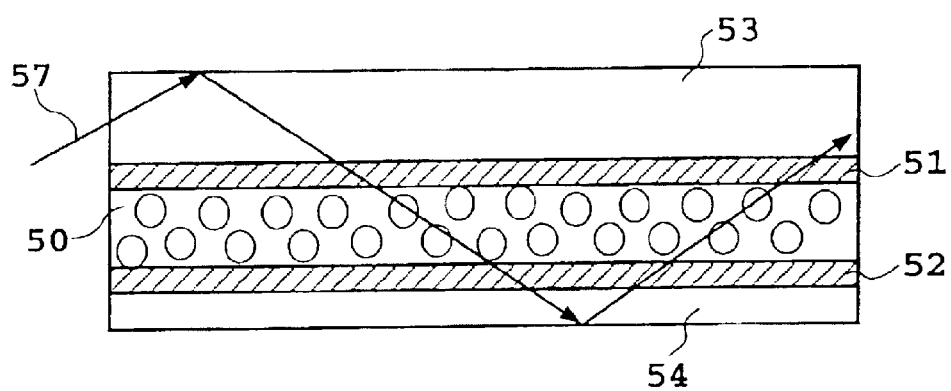

FIGS. 5A and 5B are side sectional diagrams schematically showing an embodiment of parallel reflection surface type optical device according to the present invention, in which FIG. 5A shows a state where no electric field is applied to an optical control layer, and FIG. 5B shows a state where an electric field is applied to the optical control layer.

The optical device comprises a liquid crystal layer 50 to be an optical control layer, a transparent electrode 51 and a transparent electrode 52 provided to put the liquid crystal layer 50 therebetween, a light guide 53 stacked on the transparent electrode 51, and a reflection plate 54 provided on the lower surface of the transparent electrode 52. Both surfaces of the reflection plate 54 are-shaped to be parallel to the transparent electrode 52, and the surface opposite to the surface opposing the transparent electrode 52 is the reflection surface. In the following, the optical device of the present embodiment will be described in further detail.

The liquid crystal layer 50 comprises a reverse mode PDLC (Akita Univ., Sato et al., Television Society Technical Report IDY96-50, p. 137–142), which is in a transparent state when no electric field is applied, and in a scattering state when an electric field is applied.

The optical control layer can be easily fabricated, for example, by a method in which a mixture of a UV-polymerizable liquid crystal such as UCL-002 (from Dainippon Ink and Chemicals) and a nematic liquid crystal such as E-7 (from Merck Japan) is put between two sheets of transparent plate such as optical glass provided with indium tin oxide, and irradiated with UV-light. In the present embodiment thickness of the reverse mode PDLC area (optical control layer) is set to 10 $\mu$m, however, the thickness is not limited to this value.

Since, when an electric field is applied, the reverse mode PDLC becomes a scattering state, as shown in FIG. 5A, incident light 57 is scattered on the interface between the transparent electrode 51 and the liquid crystal layer 50. Since the scattered light is incident to the interface of the light guide 53 and air at an angle differing from the incident light 57, the total reflection condition is not met and the light is outputted to the outside, and the device is in a light emitting state.

When no electric field is applied, the reverse mode PDLC is in a transparent state. Therefore, as shown in FIG. 5B, light repeats reflections on the light guide 53 provided with the transparent electrode 51 and the reflection plate 54 provided with the transparent electrode 52, and within the light guide area of liquid crystal layer 50 disposed therebetween, and does not go to the outside, and the device is in a non-light emitting state.

That is, a light bulb can be achieved which is possible to turn on and off light by an electric field. Since output light in this case is scattered light, an advantage of wide viewing angle is obtained.

Here, the reverse mode PDLC indicates all types of polymer/liquid crystal composite thin film which are normally transmissive and scattering under an electric field, which may be a droplet type in which LC droplets are distributed in a polymer resin and the polymer resin is a continuous area, a polymer ball type in which both the polymer resin and the liquid crystal are continuous area, a type in which resin particles are dispersed in a liquid crystal and the resin area is discontinuous, or a type in which polymer network exists in a liquid crystal.

Further, the end surface of the light guide 53 can be polished into a smooth surface and provided thereon except for a light incident part with a reflection film to improve light confinement characteristic within the light guide. In the present Embodiment 3, the PDLC is inserted between light transmission plates provided with transparent electrodes, however, alternatively, an electrode capable of making mirror reflection of light such as a metal plate may be used in place of the reflection plate 54 provided with the transparent electrode 52.

Since, in the present Embodiment 3, the refractive index of the light guide 53 may be small as compared with the liquid crystal, materials can be flexibly selected as compared with Embodiments 1 and 2. In addition, since an angled reflection surface is not necessary, a thin structure can be achieved. Further, since it uses a thin film which is transparent when no electric field is applied and produces a scattering ability by applying an electric field, a high-contrast display can be achieved without light emission of electrode gap during matrix drive.

(Embodiment 4)

Figure 6A:
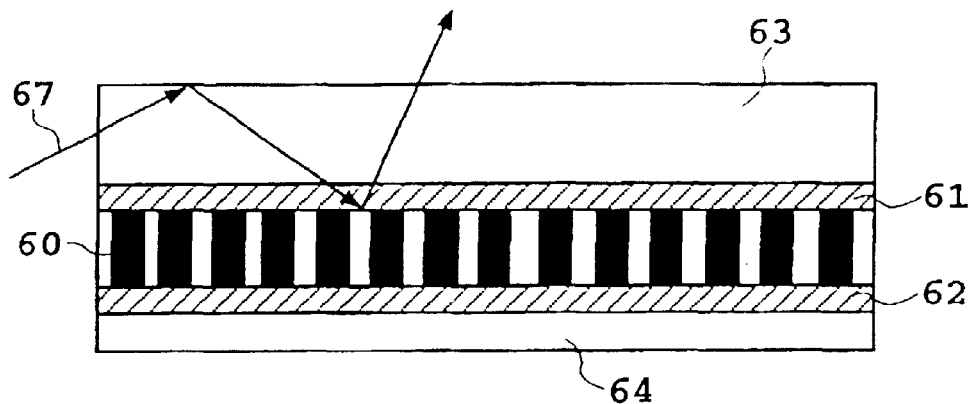
Figure 6B:
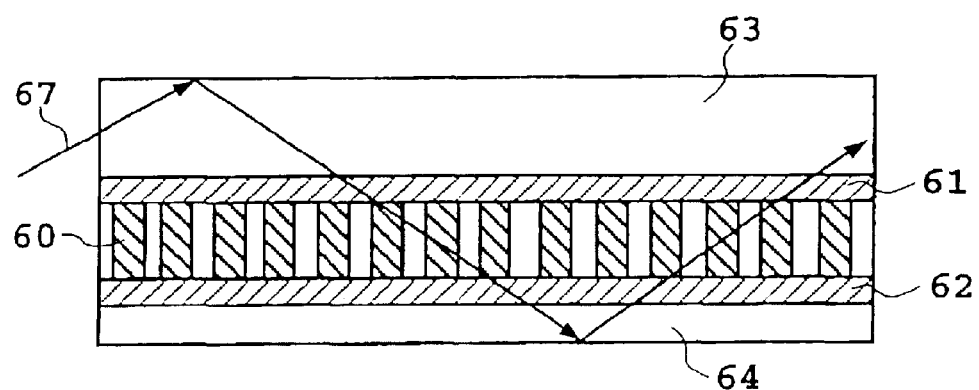
Figure 7A:
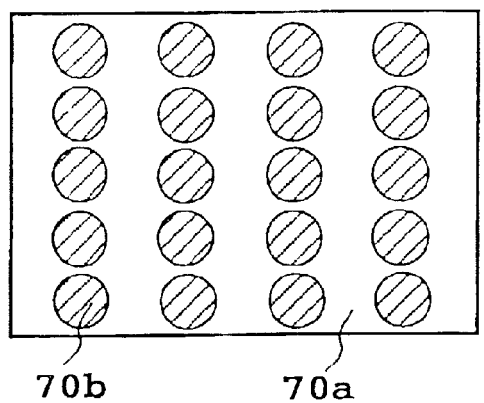
FIGS. 7A, 7B and 7C are schematic plane diagrams showing the structure of a thin film applied to the optical device according to the present invention.
Figure 7B:
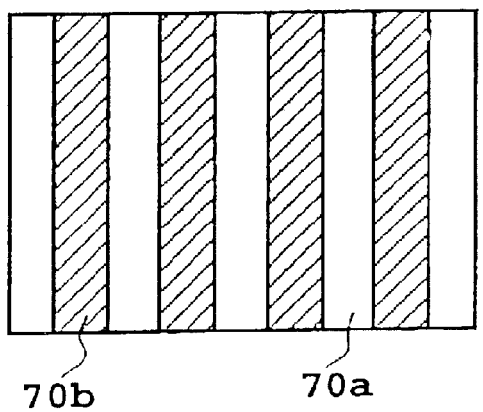
Figure 7C:
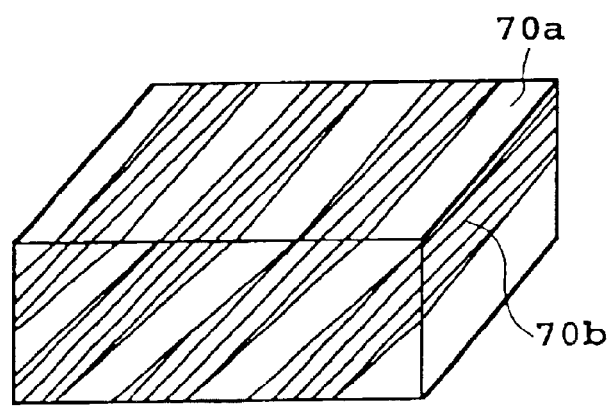

FIGS. 6A and 6B are side sectional diagrams schematically showing an embodiment of parallel reflection surface type optical device according to the present invention, in which FIG. 6A shows a state where no electric field is applied to an optical control layer, and FIG. 6B shows a state where an electric field is applied to the optical control layer;

The optical device comprises a liquid crystal layer 60 to be an optical control layer, a transparent electrode 61 and a transparent electrode 62 provided to put the liquid crystal layer 60 therebetween, a light guide 63 stacked on the transparent electrode 61, and a reflection plate 64 provided on the lower surface of the transparent electrode 62. Both surfaces of the reflection plate 64 are-shaped to be parallel to the transparent electrode 62, and the surface opposite to the surface opposing the transparent electrode 62 is the reflection surface. The liquid crystal layer, as shown in FIGS. 7A, 7B and 7C, comprises a PDLC in which a liquid crystal 70b distributes in the form of a diffraction grating in a transparent polymer resin 70a. In the following, the optical device of the present embodiment will be described in further detail.

The optical control layer can be easily fabricated, for example, by a method in which two sheets of transparent plate such as an optical glass plate provided with indium tin oxide are prepared, a 1:1 ratio mixture of a UV-curable resin such as NOA-65 (from Norland Products, Inc. (US)) and a nematic liquid crystal such as E-7 (from Merck Japan) is put between the two sheets of transparent plate, and irradiated with an interference fringe of a UV-laser such as argon ion laser (wavelength 351 nm) to cure the high light intensity part (peak of the interference fringe). In the present embodiment thickness of the PDLC area is set to 10 μm, however, the thickness is not limited to this value.

As shown in FIG. 6A, when no electric field is applied to the optical control layer, the PDLC is in a diffraction state, incident light is diffracted by the interface of the transparent electrode 61 and the optical control layer 60. Since the diffracted light is incident to the interface of the light guide 63 and air at an angle differing from an incident light 67, the total reflection condition is not met and the light is outputted to the outside, and the device is in a light emitting state.

Next, as shown in FIG. 6B, when an electric field is applied to the optical control layer 60, since the PDLC becomes transparent, light repeats reflections on the light guide 63 provided with the transparent electrode 61 and the reflection plate 64 provided with the transparent electrode 62, and within the light guide area of the PDLC 60 disposed therebetween, and does not go to the outside, and the device is in a non-light emitting state. That is, a light bulb can be achieved which is possible to turn on and off light by an electric field.

Further, the entire end surfaces of the light guide can be polished into smooth surfaces and provided with reflection films on these end surfaces except for the light incident part to improve light confinement characteristic within the light guide.

In the present Embodiment 4, PDLC is put between light transmission plates provided with transparent electrodes, however, alternatively, an electrode capable of making mirror reflection of light such as a metal plate may be used in place of the reflection plate 64 provided with the transparent electrode 62.

Since, in the present Embodiment 4, transmitted diffraction light can be utilized by using a reflective electrode, an increased intensity can be achieved.

In the present Embodiment 4, since the refractive index of the light guide may be small as compared with the liquid crystal, materials can be flexibly selected as compared with Embodiments 1 and 2. In addition, since an angled reflection surface is not necessary, a thin structure can be achieved.

In the liquid crystal layer 60, as shown in FIGS. 7A to 7C, the liquid crystal 70b distributes in the form of a diffraction grating in the polymer resin 70a. The liquid crystal 70b, as in Embodiment 3, may be one in which LC droplets periodically distribute, or linearly-shaped as in FIG. 7B. Further, as in Embodiment 6 which will be described later, a diffraction grating-like refractive index distribution may be induced by driving the liquid crystal 70b by a comb-shaped electrode.

Still further, it may be a thick diffraction grating having a periodic structure in the thickness direction or a hologram, like a holographic PDLC (HPDLC) (Shingaku-giho, EID95-147, p. 131) as shown in FIG. 7C.

Here, the PDLC indicates all types of composite thin films comprising the polymer resin 70a and the liquid crystal 70b, which may be a droplet type in which LC droplets are distributed in the polymer resin 70a and the polymer resin 70a is a continuous area, a polymer ball type in which both the polymer resin 70a and the liquid crystal 70b are continuous areas, or a type in which resin particles are dispersed in the liquid crystal 70b and the resin area is discontinuous.

As the optical control layer, by using a reverse mode PDLC (Akita Univ., Sato et al., Television Society Technical Report IDY96-50, p. 137–142), which is in a transparent state when no electric field is applied, and in a scattering state when an electric field is applied, it is possible to reverse the response characteristic to an electric field and prevent the electrode gap from emitting light even when the electrode is divided.

In particular, when HPDLC is used, since it is a volume hologram, it is possible to control directivity and make light emitting display using light of high color purity. Further, since directivity is high and light does not reach an unnecessary place, the image is high in brightness. Still further, since there is a wavelength selectivity, color display is possible.

In the present Embodiment 4, since incident light from the light guide is diffracted to be display light, other incident light, for example, illumination light in the room, is not diffracted or diffracted to another direction, only the display light reaches eyes of the person viewing the display, thereby achieving good display without degradation.

(Embodiment 5)

Figure 8A:
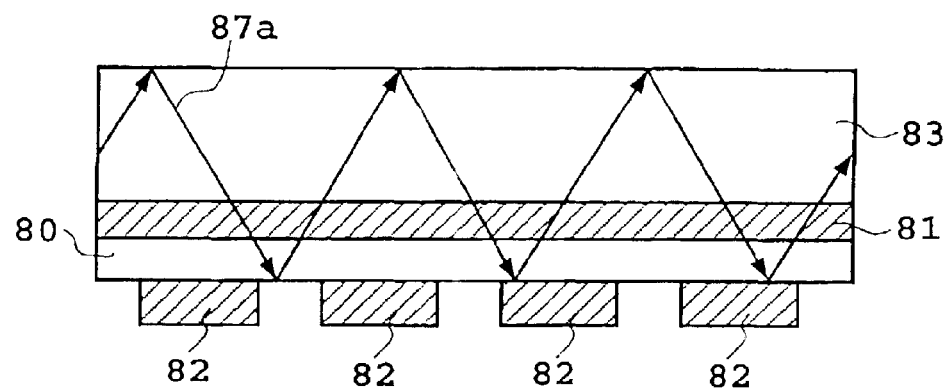
Figure 8B:
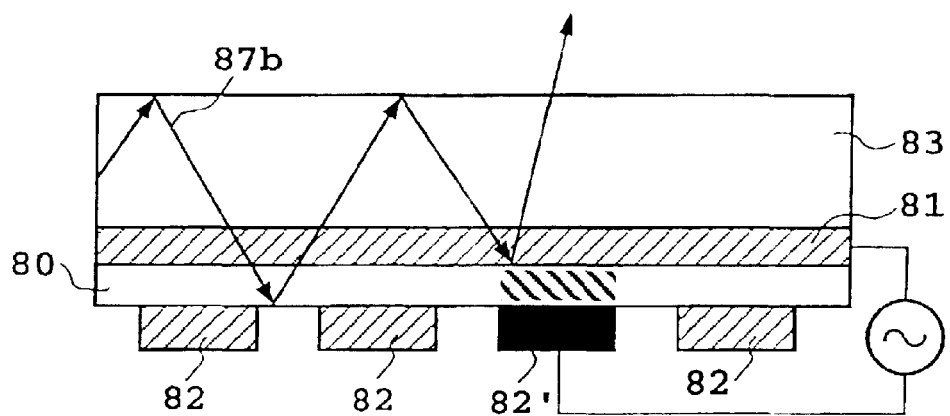

FIGS. 8A and 8B are side sectional diagrams schematically showing an embodiment of parallel reflection surface type optical device according to the present invention, in which FIG. 8A shows a state where no electric field is applied to an optical control layer, and FIG. 8B shows a state where an electric field is applied to a specific part of the optical control layer. This embodiment is one in which electrode in already described Embodiments 3 and 4 is divided.

In the present Embodiment 5, as shown in FIGS. 8A and 8B, a thin film (the optical control layer) 80 comprising a reverse mode PDLC prepared using a liquid crystalline monomer (UCL-001, UCL-002 or the like, both from Dainippon Ink and Chemicals) is attached to a light guide 83 provided with a transparent electrode 81, and a divided electrode 82 capable of making mirror reflection is provided on the lower surface of the thin film 80.

Since the entire PDLC is transparent when no electric field is applied, light(indicated by an arrow 87a) is confined within the light guide 83 as shown in FIG. 8A. Next, when an electric field is applied to a particular electrode, since only that part 82' becomes scattering or diffraction state, a device can be achieved in which as shown in FIG. 8B, only the part corresponding to the electrode emits light(indicated by an arrow 87b).

Since, in the present Embodiment 5, the refractive index of the light guide may be small as compared with the liquid crystal, materials can be flexibly selected as compared-with Embodiments 1 and 2. In addition, since an angled reflection surface is not necessary, a thin structure can be achieved.

Further, the PDLC forming the thin film 80 may be one in which LC droplets as shown in FIG. 7A periodically distribute, or linearly-shaped as in FIG. 7B. Still further, a diffraction grating-like refractive index distribution may be induced by driving the liquid crystal 70b by a comb-shaped electrode as in Embodiment 6 which will be described later.

Yet further, the present Embodiment 5 uses a reverse mode PDLC as the thin film 80, however, alternatively, a holographic PDLC may be used as in the above-described Embodiments 3 and 4.

(Embodiment 6)

Figure 9A:
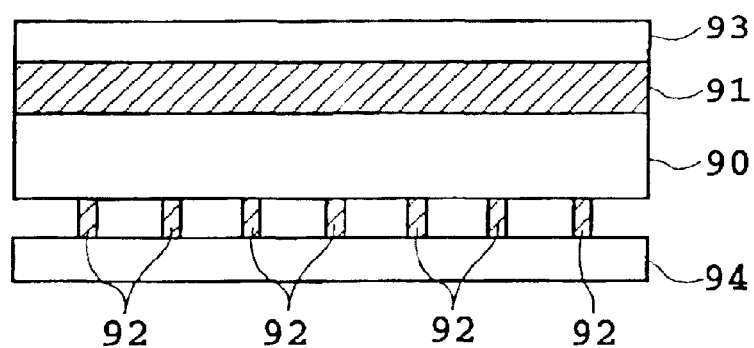
Figure 9B:
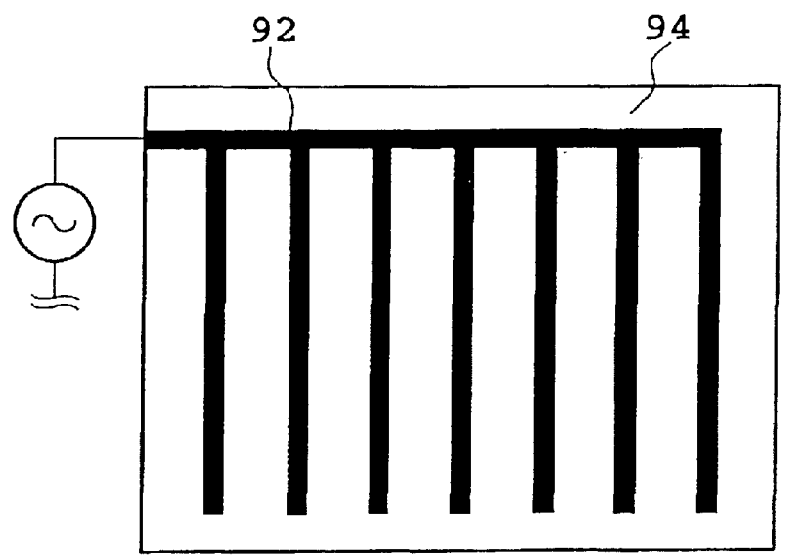

FIGS. 9A and 9B are diagrams schematically showing an embodiment of parallel reflection surface type optical device according to the present invention, in which FIG. 9A is a side sectional diagram of the optical device, and FIG. 9B is a plane diagram showing a comb-shaped electrode (hereinafter referred also to as fine periodic electrode) which is formed on a substrate;

The optical device comprises a thin film 90 to be an optical control layer, a transparent electrode 91 and a comb-shaped electrode 92 provided to put the thin film 90 therebetween, a light guide 93 stacked on the transparent electrode 91, and a substrate 94 provided on the lower surface of the comb-shaped electrode 92. The comb-shaped electrode 92 has a plurality of branches divided in the form of a comb, and the entire plurality of branches are at a same potential by electrically connecting one or more area thereof. Further, the plurality of branches are periodically distributed in a-size to an extent that a fine periodic structure to diffract light can be induced in the thin film (optical control layer). Such a comb-electrode can be easily-shaped by uniformly depositing an electrode such as aluminum on a substrate such as glass, and patterning according to a photolithographic technique.

In the present embodiment, a case where a reverse mode PDLC is used for a thin film 90 will be described. The thin film comprising the reverse mode PDLC is uniformly transparent when no electric field is applied. On the other hand, by applying an electric field between the transparent electrode 91 and the periodic electrode 92, a refractive index distribution is generated in the area of the thin film 90 applied with the electric field, and incident light is scattered. As a result, a light scattering area is periodically-shaped as the entire thin film, and the thin film 90 becomes a diffraction state.

In the optical device constructed as above, for example, a uniformly aligned liquid crystal can also be used in place of the reverse mode PDLC. Also in this case, a refractive index distribution can be induced as described above.

(Embodiment 7)

Figure 10A:
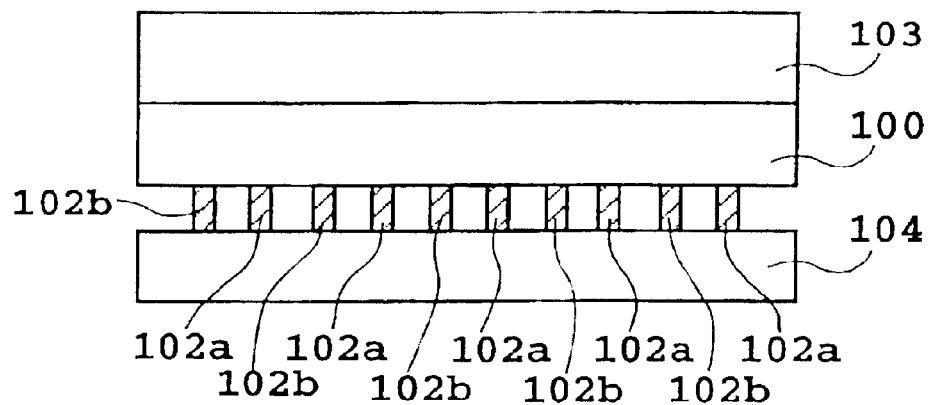
Figure 10B:
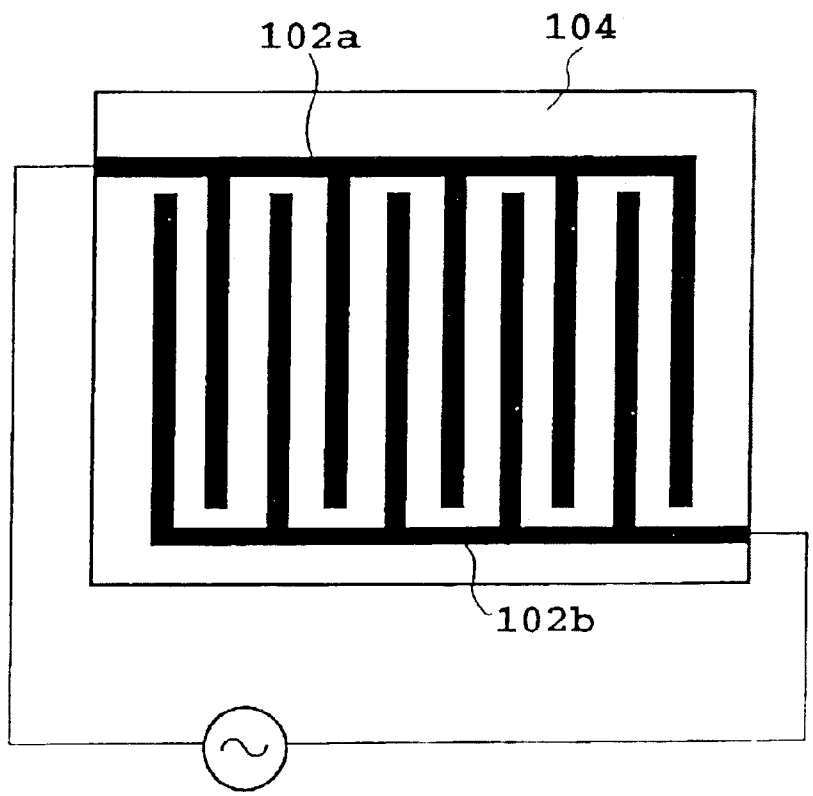

FIGS. 10A and 10B are diagrams schematically showing an embodiment of parallel reflection surface type optical device according to the present invention, in which FIG. 10A is a side sectional diagram of the optical device, and FIG. 10B is a plane diagram showing a comb-shaped electrode which is formed on a substrate;

This optical device comprises a thin film 100 to be an optical control layer, comb-shaped electrodes 102a and 102b provided between the thin film 100 and a substrate 104, and a light guide 103 stacked on the thin film 100. That is, the device has a first electrode 102a and a second electrode 102b-shaped on the same plane of the substrate 104, and.the first electrode 102a and the second electrode 102b oppose so as to dispose the branches in alternation. The thin film 100 is, for example, one using a reverse mode PDLC, which is constructed by forming on the substrate 104. That is, in this construction, a pair of electrodes are provided in the same plane under the optical control layer, and a voltage is applied across these electrode to generate an electric field.

The thin film 100 comprising the reverse mode PDLC is uniformly. transparent when no electric field is applied, on the other hand, by applying a voltage between the periodic electrodes 102a and 102b, an electric field parallel to the substrate 104 is generated between the periodic electrodes 102a and 102b. Since, by the generated electric field, a refractive index distribution is generated in the area between the periodic electrodes 102a and 102b, and incident light becomes a scattering state, which forms a periodic scattering area. This causes the thin film 100 to be a diffraction state. A reverse mode PDLC is used as the thin film 100, however, the present invention is not limited to this. For example, using a uniformly aligned liquid crystal, a periodic refractive index distribution may be induced by applying an electric field.

(Embodiment 8)

Figure 11A:
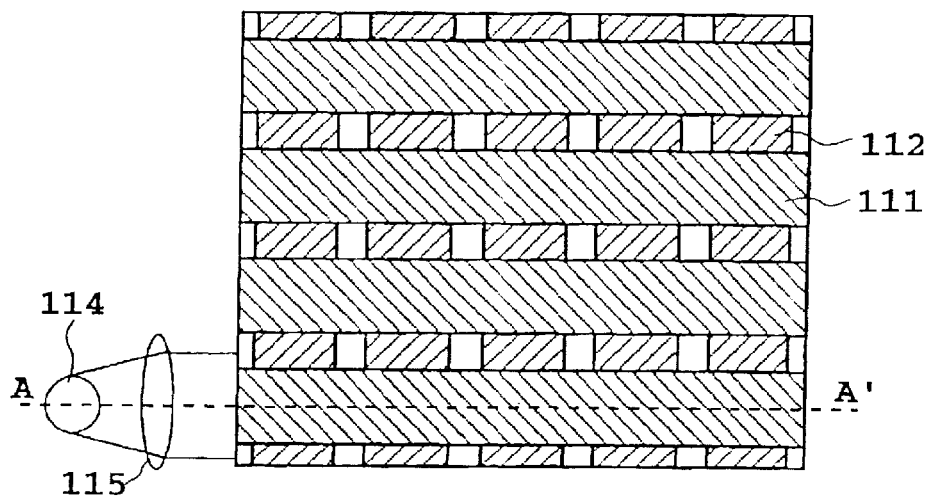
Figure 11B:
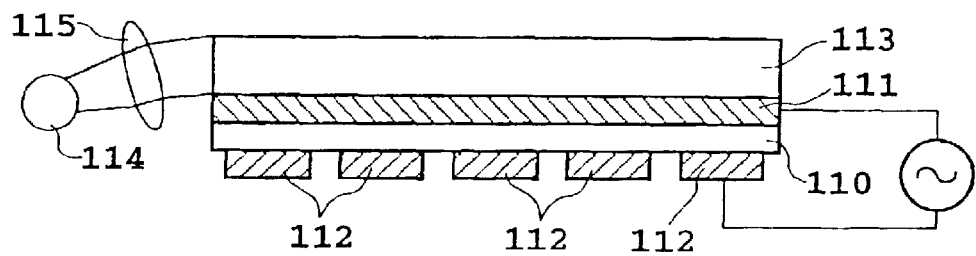
Figure 11C:
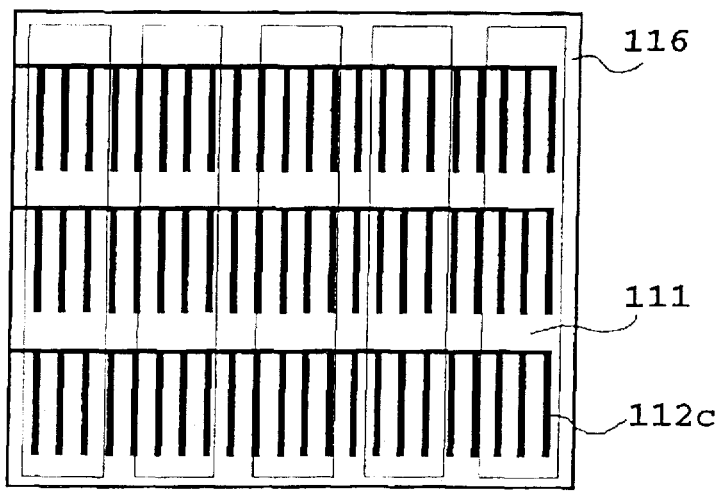

FIGS. 11A, 11B and 11C show an example of display apparatus according to the present invention, in which FIG. 11A is a plane diagram, FIG. 11B is a sectional diagram taken along line A-A' in FIG. 11A, and FIG. 11C is a plane diagram of another electrode applied to FIG. 11B.

This display apparatus has an optical device, illumination means for transmitting light to the optical device, and a power supply (not shown) for driving the optical device.

The optical device comprises a liquid crystal layer 110 to be an optical control layer, a plurality of strip-shaped transparent electrodes 111 provided to be apart from and parallel to each other on the upper surface of the liquid crystal layer 110, a plurality of strip-shaped electrodes 112 provided to be apart from each other and perpendicular to the transparent electrodes 111 on the lower surface of the liquid crystal layer 110 for making mirror reflection of light, and a light guide 113 provided on the upper surface of the transparent electrode 111. In the present embodiment, a holographic PDLC is used as the liquid crystal layer 110. In this case, since the HPDLC is not light scattering during light emission, a display apparatus can be achieved with high color purity.

Further, a reverse mode PDLC or a reverse mode holographic PDLC may be used in place of the holographic PDLC. When the reverse mode PDLC is used, because light emission does not take place between the strip-shaped electrodes, a high-contrast display apparatus can be achieved. When the reverse mode holographic PDLC is used, because light emission does not take place between the strip-shaped electrodes, a display apparatus can be achieved which is capable of making color display even under white illumination. The reverse-mode holographic PDLC is one of the holographic PDLCs and uses a polymer crystal liquid as a polymer resin of the holographic PDLC. Furthermore, the reverse-mode holographic PDLC becomes a uniform double-refractive thin film under conditions without the application of an electric field. On the other hand, the reverse-mode holographic PDLC diffracts and reflects the incident light by the faction of the PDLC as a hologram under conditions with the application of an electric field.

The illumination means is to apply light from an end surface of the light guide 113, and has an illumination 114 and a lens 115 for focusing light from the illumination 114 onto the end surface. Of all the end surfaces of the light guide, end surfaces other than inputted with light from the illumination 114 and focused by the lens 115 are deposited with metal films or the like for reflecting light.

By connecting the strip-shaped electrodes 111 and 112, an electric field is applied to the optical device.

Incident light is confined within the light guide area of the light guide 113 provided with the transparent electrodes 111 and the liquid crystal layer 110, however, when a voltage is applied between the transparent electrode 111 and the perpendicular strip-shaped mirror reflecting electrode 112, the holographic PDLC at the cross point becomes a diffraction state and emits light. By scanning the electrodes, an optional bit map image can be displayed.

As another aspect of the present embodiment, a transparent electrode may be used in place of the electrode 112 for mirror reflecting light of the strip-shaped electrodes. When a transparent electrode is used as the electrode 112, a reflection plate comprising a light transmissive plate may be provided on the lower surface of the electrode 112.

As a still further aspect of the present embodiment, the comb-shaped electrode described in Embodiment 6 can be used in place of the strip-shaped mirror reflecting electrode 112. That is, the thus constructed optical device has a plurality of strip-shaped transparent electrodes 111 provided apart from and parallel to each other on the upper surface of the liquid crystal layer 110 as shown in FIG. 11C, and a plurality of comb-shaped electrodes 112c provided perpendicular to the transparent electrodes through the liquid crystal layer 110. The plurality of comb-shaped electrodes can be readily-shaped by depositing an electrode such as aluminum uniformly on a substrate 116, for example, a glass substrate, and patterning by a photolithographic technique. When such comb-shaped electrodes are used, the liquid crystal itself is not required to have a periodicity. For this reason, the liquid crystal forming the liquid crystal layer is not necessary to be a holographic PDLC, and it is sufficient to use a reverse mode PDLC or a uniformly aligned liquid crystal.

Further, either of the strip-shaped transparent electrodes 111 applied in the present embodiment or the electrode provided on the lower surface of the liquid crystal layer can be divided into display pixel units, and each of the divided pixel be provided with a switching device. Here, the electrode which is provided on the lower surface of the liquid crystal layer and divided may be either of the above-described transparent electrode or mirror reflecting electrode. Shape of such an electrode may be strip-shaped or comb-shaped.

(Embodiment 9)

The present embodiment is an example of display apparatus of the present invention for making active matrix drive such as TFT drive, in which the display apparatus is constructed using an electrode divided into display pixel units and a single electrode opposing the electrode and extending over the entire display area. The display apparatus includes an optical device, illumination means for sending light to the optical device, and a power supply for driving the optical device. The electrode of the present embodiment comprises a transparent upper electrode and a lower electrode opposing the above electrode. The lower electrode may be transparent or mirror reflecting electrode.

Shape of the electrode may be (A) a single sheet of electrode extending over the entire display area, (B) a single sheet of electrode divided into display pixel units and extending in internal areas of the respective pixels, (C) a comb-shaped electrode extending over the display area and electrically unity, or (D) a comb-shaped electrode divided into display pixel units, extending in internal areas of the respective pixels and electrically unity.

Combinations of these electrodes are considered to include mainly:

(i) A combination in which one electrode is a single sheet of electrode in the entire display area, and the other electrode is a single sheet of electrode in an area divided into display pixel units (A–B);

(ii) A combination in which one electrode is a single sheet of electrode in the entire display area, and the other electrode is a comb-shaped electrode divided into display pixel units (A–D)

(iii) A combination in which one electrode is a single sheet of electrode in an area divided into display pixel units, and the other electrode is a comb-shaped electrode in the entire display area (B–C); and (iv) One electrode is a comb-shaped electrode in the entire display area, and the other electrode is a comb-shaped electrode divided into display pixel units (D–C).

In this case, the upper electrode is required to be made of a transparent material as described above.

Further, a liquid crystal suitable for use as the optical control layer inserted between the upper electrode and the lower electrode varies with the above electrode combination. That is, in the case of (i), as the optical control layer, it is appropriate to use a reverse mode PDLC, a holographic PDLC, a reverse mode holographic PDLC or the like which is capable of electrically controlling the scattering ability or diffraction ability. In particular, by using the holographic PDLC which can be changed in diffraction ability, high-contrast display is possible. In the cases of (ii), (iii) and (iv), since diffraction is provided by the comb-shaped electrode, as the optical control layer, it is sufficient to use a reverse mode PDLC or a uniformly aligned liquid crystal.

Figure 12A:
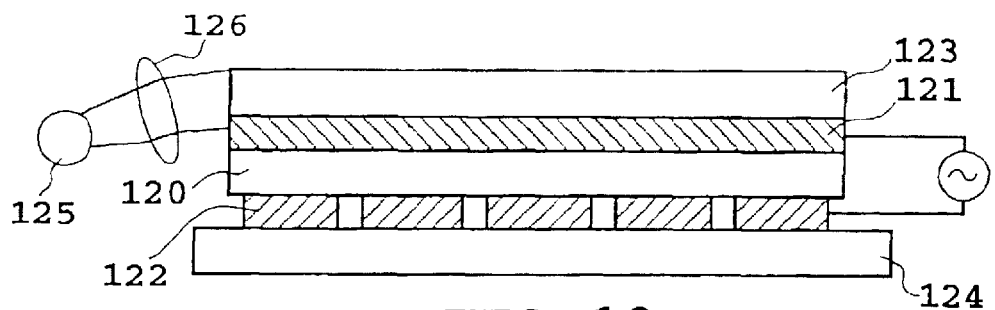
Figure 12B:
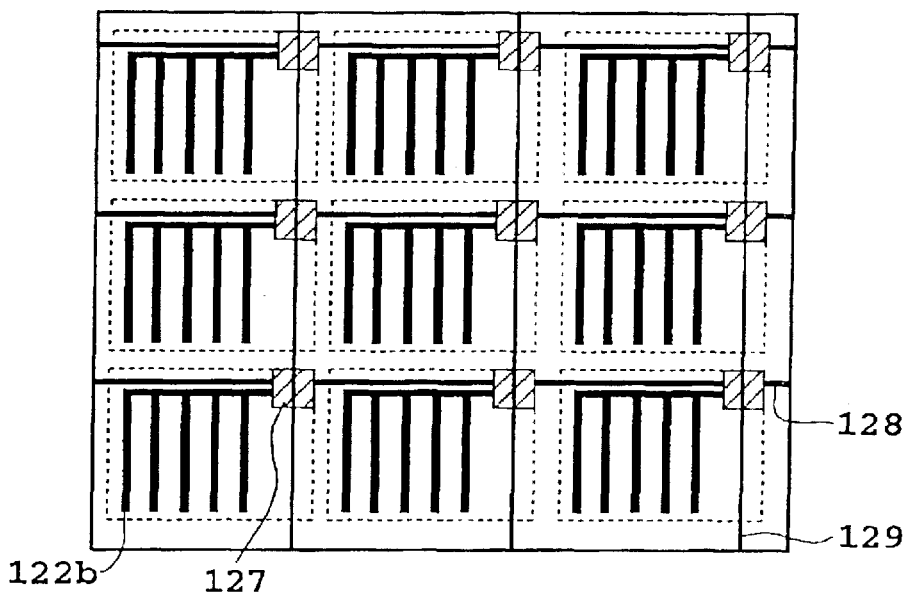
Figure 12C:
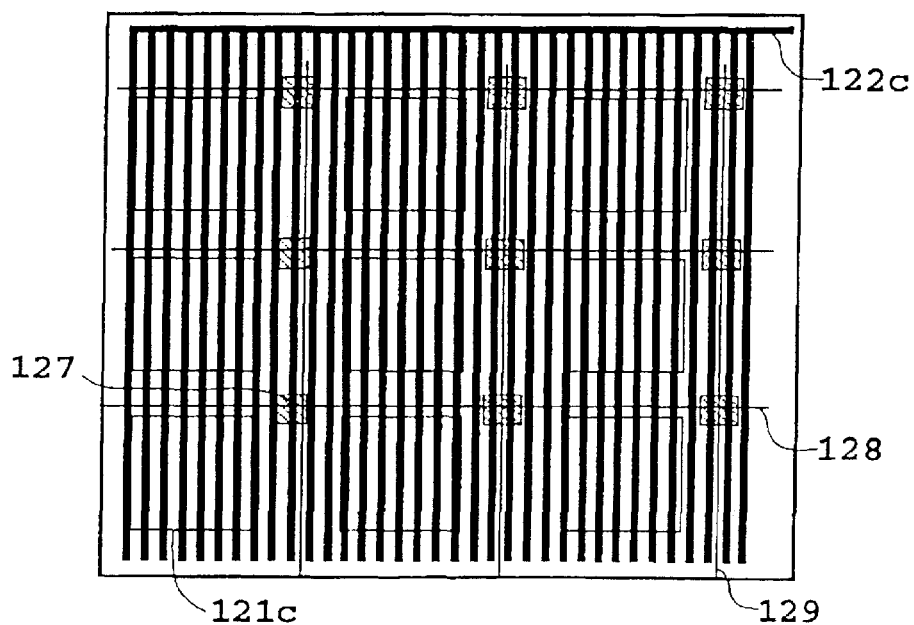

In the present embodiment, of the above combinations, two types of display apparatus will be described with reference to FIGS. 12A, 12B and 12C. FIG. 12A is a side sectional diagram showing schematic illustration of a display apparatus, FIGS. 12B and 12C are plane diagrams showing an electrode group divided into display pixel units.

(I) When the upper electrode is a single sheet of transparent electrode in the display area, and the lower electrode is a comb-shaped electrode divided into display pixel units.

The display apparatus having a comb-shaped electrode divided into display pixel units will be described with reference to FIGS. 12A and 12B.

The optical device comprises an optical control layer 120, a transparent electrode 121 stacked on the upper surface of the optical control layer 120, a comb-shaped electrode 122 inserted between the lower surface of the optical control layer 120 and a substrate 124, and a light guide 123 provided on the optical control layer 120 through the transparent electrode 121. At an end of the light guide 123, illumination means (light source 125 and lens 126) is provided as in Embodiment 8.

As shown in FIG. 12B, each of the comb-shaped electrode 122b divided into display pixel units (in the figure, indicated by broken lines) is provided with a switching device 127, and a scanning electrode 128 and a signal electrode 129 are provided in the form of a grating so that each electrode can be applied independently with a voltage.

In the present embodiment, a reverse mode PDLC is used as the liquid crystal forming the optical control layer 120. As shown in FIG. 12A, it is possible to apply an electric field to the optical control layer by connecting the electrodes 121 and 122 to the power supply. When no electric field is applied to the optical control layer, the liquid crystal is in a transmission state. However, when an electric field is applied, the liquid crystal becomes a scattering state. When the display apparatus is constructed using an optical device having a liquid crystal layer comprising a reverse mode PDLC, because the electrode gap does not emit light as compared with a case using a conventional PDLC, contrast of the display apparatus can be enhanced. Further, in place of the reverse mode PDLC, for example, a uniformly aligned liquid crystal may be used.

(II) When the upper electrode is a single sheet of transparent electrode divided into display pixel units, and the lower electrode is a single sheet of comb-shaped electrode extending over the entire display area.

Next, as another aspect of the present embodiment, a case in which the transparent electrode 121 is divided into display pixel units as shown in FIG. 12C will be described. In this case, a comb-shaped electrode 122 is-shaped over the entire surface of the substrate to oppose each of the divided electrode 121c. As shown in FIG. 12C, each of the electrode 121c divided into display pixel units is provided with a switching device 127, and a scanning electrode 128 and a signal electrode 129 are provided in the form of a grating so that each electrode can be applied independently with a voltage.

As described above, by providing the scanning electrode 128 and the signal electrode 129 in the form of a grating so that each of the electrodes divided into display pixel units can be applied independently with a voltage, TFT drive is possible. By making TFT drive and controlling potential of each electrode, bit map display is possible.

(Embodiment 10)

In this embodiment, a backside drive type display apparatus will be described with reference to FIGS. 13A, 13B and 13C. Respective layers constituting the display apparatus are stacked in the same stacking order as in Embodiment 9, however, the following points differ from the apparatus described in Embodiment 9.

Figure 13A:
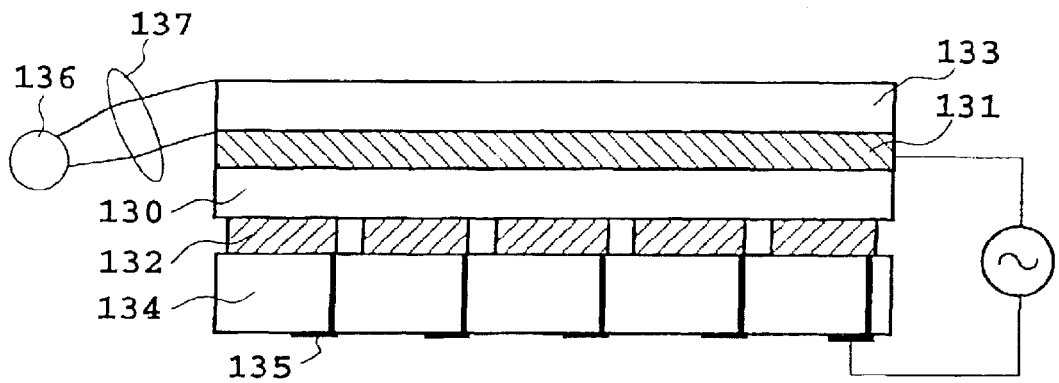
Figure 13B:
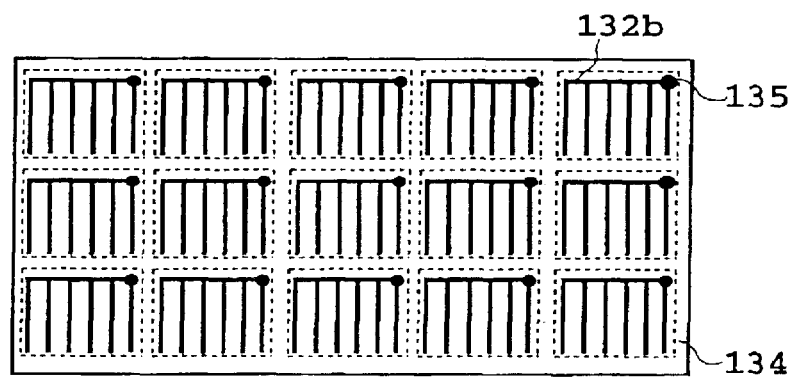
Figure 13C:
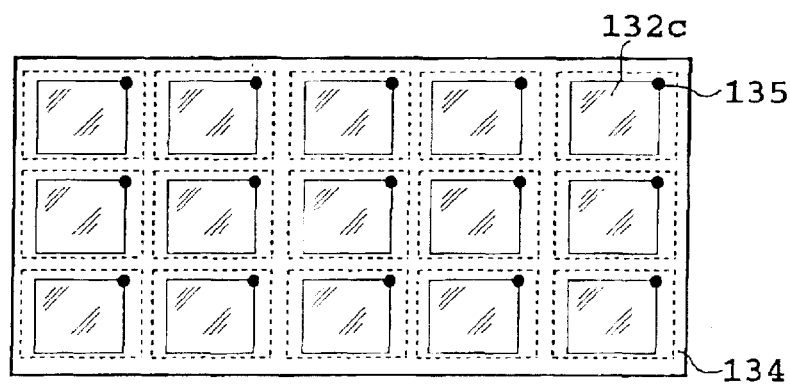

FIGS. 13A, 13B and 13C show an example of display apparatus according to the present invention, in which FIG. 13A is a schematic side sectional illustration of the display apparatus, and FIGS. 13B and 13C are plane diagrams showing an electrode group divided into display pixel units (in the figure, indicated by broken lines). The electrode provided on the lower surface of the optical control layer and divided into display pixel units may be a transparent or mirror reflecting one. Further, shape of the electrode may be comb-shaped (FIG. 13B, 132b) or single square in the area divided into display pixel units (FIG. 13C, 132c).

For wiring as shown in FIG. 13A, a substrate 134 and an electrode 132 provided on the upper surface of the substrate are provided with fine holes, and inside of the hole is filled with a conductive material such as a metal. The black circle in the figure indicates a part where an extending electrode (backside electrode) 135 penetrating the substrate connects to the divided electrode 132 disposed on the upper surface of the substrate. Next, the thus-shaped substrate penetrating electrode 135 is wired to the power supply so that each electrode 132 divided into display pixel units can be applied independently with a voltage. At an end of the light guide 133, illumination means (light source 136 and lens 137) is provided as in Embodiments 8 and 9.

In the present embodiment, as the divided electrode 132 and the transparent electrode 131 provided through the liquid crystal layer (the optical control layer) 130, uniformly extending electrodes are used, however, alternatively, strip-shaped electrodes extending in an area opposing the divided electrodes 132 can be used.

In the present embodiment, since drive is possible from the lower surface (backside surface) of the substrate, drive substrate can be divided and arranged without leaving spaces. Further, by using an optical control layer having an adhesiveness such as a PDLC, the drive substrates can be arranged in the form of tiles and bonded. With such construction, a large-sized display can be achieved which is not affected by signal delay due to large-area construction and without gaps.

The display apparatus constructed in Embodiment 8 can also be driven from the backside as in the present embodiment, and provides the same effects by backside drive. In this case, an electrode divided into strips is used as numeral 131, electrode shape of 132 is strip-shaped (elongate rectangle), and longitudinal directions of the strips 131 and 132 are perpendicular to each other. In this case, for the electrode 132, electrical conductivity is not necessary to the end of the display apparatus for driving from the backside. Therefore, the length of the strip 132 can be optionally divided independently of the screen size of the display apparatus, and simple matrix drive is possible even with a liquid crystal material of a high multiplicity (a moderate threshold characteristic).

Regarding the display apparatus constructed in Embodiment 9, the scanning electrode and the signal electrode may be constructed so as to be driven from the lower surface (backside surface) of the substrate. With such construction, therefore, a large-sized display can be achieved as in the case of the present embodiment.

(Embodiment 11)

Figure 14:
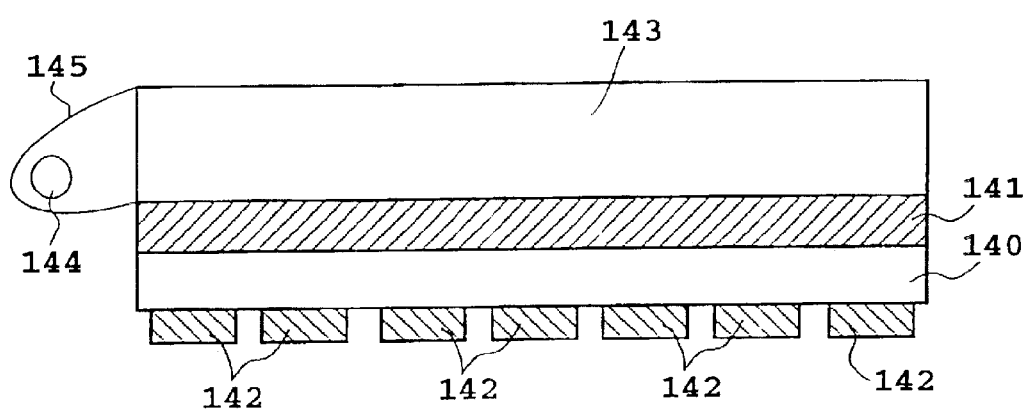
FIG. 14 is a sectional diagram showing an example of display apparatus according to the present invention.

FIG. 14 is a sectional diagram showing an example of display apparatus according the present invention.

This display apparatus has an optical device, illumination means for sending light to the optical device, and a power supply (not shown) for driving the optical device, having the same construction as Embodiment 8 except for the illumination means. That is, the illumination means is for applying light from an end surface of the light guide 143, and comprises an light source 144 and a member 145 having a mirror surface surrounding the light source 144.

The other construction comprises a liquid crystal layer 140 to be an optical control layer, a plurality of strip-shaped transparent electrodes 141 provided to be apart from and parallel to each other on the upper surface of the liquid crystal layer 140, a plurality of strip-shaped electrodes 142 provided to be apart from each other and perpendicular to the transparent electrodes 141 on the lower surface of the liquid crystal layer 140 for making mirror reflection of light, and a light guide 143 provided on the upper surface of the transparent electrode 141.

By mounting the light source 144 to an edge of the display apparatus, a compact and high efficiency display apparatus can be achieved as compared with the display apparatus shown in FIGS. 11A and 11B.

Further, Embodiments 8 to 11 use a holographic PDLC, however, alternatively, by using a PDLC, a black-and-white display can be achieved. Still further, by preparing three colors of red, yellow, and green for the light source and switching the light source color in synchronization with display pixel, full color display can be achieved.

The present embodiment has the same construction as Embodiment 8 except for the illumination means, however, instead of Embodiment 8, the construction of Embodiment 9 or 10 can be used.

(Embodiment 12)

Figure 15A:
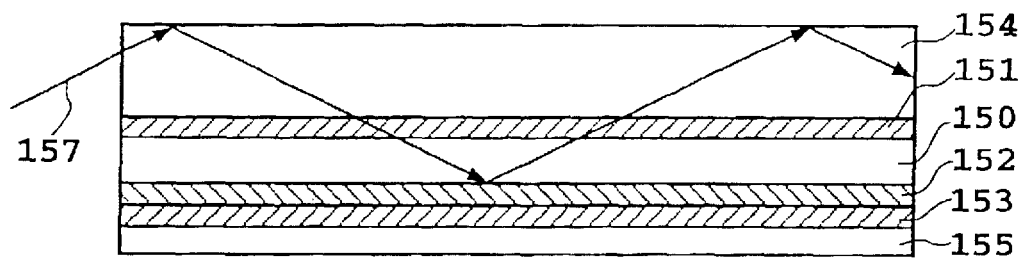
Figure 15B:
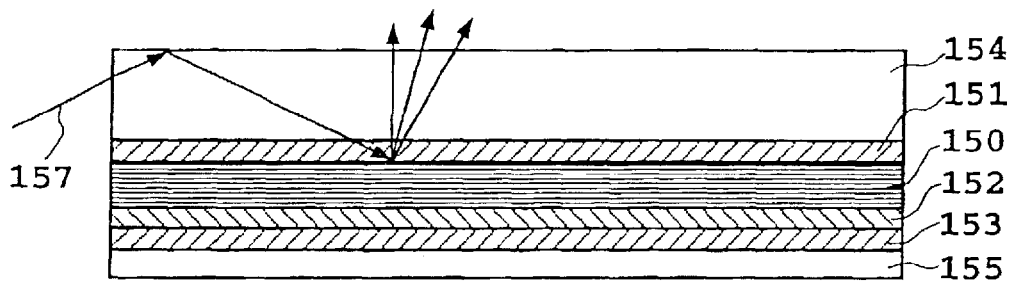

FIGS. 15A and 15B are side sectional diagrams schematically showing an embodiment of parallel reflection surface type optical device according to the present invention, in which FIG. 15A shows a case where a thin film (reverse mode PDLC) is in a transmission state, and FIG. 15B shows a case where the thin film (reverse mode PDLC) is in a scattering state.

The optical device, as shown in FIGS. 15A and 15B, comprises a stacked structure having a thin film 150 to be an optical control layer, a transparent electrode 151 provided on the upper surface of the thin film 150, an electrode 153 provided on the lower surface of the optical control layer 150 through a reflection film 152, a light guide 154 provided on the upper surface of the transparent electrode 151, and a substrate 155 provided on the lower surface of the electrode 153.

As the thin film 150, a reverse mode PDLC (Akita Univ., Sato et al., Television Society Technical Report IDY96-50, p. 137–142) or the like is used, which is in a transmission state when no electric field is applied, and in a scattering state when an electric field is applied.

The optical device of the present Embodiment 12 can be easily fabricated, for example, by a method in which a transparent electrode such as indium tin oxide is-shaped by deposition or the like on the light guide comprising highly transparent glass such as 7059 (from Corning (US)), and the surface of the transparent electrode is alignment processed by rubbing or the like. Further, a substrate such as glass provided thereon with an electrode such as aluminum or indium tin oxide thin film is provided with a reflection film such as a resin film interspersed with metal particles, and the surface is alignment processed by rubbing or the like. The both components are opposed so that the alignment directions are antiparallel, a mixture of a UV-polymerizable liquid crystal such as UCL-002 and a nematic liquid crystal such as E-7 is inserted in-between, and irradiated with UV-light.

In the optical device of the present Embodiment 12, since the thin film (reverse mode PDLC) 150 is in a transmission state when no electric field is applied, as shown in FIG. 15A, incident light 157 repeats reflections within the light guide area between the light guide 154 provided with the transparent electrode 151 and the thin film 150 and does not go to the outside, and the device is in a non-light-emitting state. Further, when an electric field is applied, since the thin film (reverse mode PDLC) 150 becomes a scattering state, as shown in FIG. 15B, guided light is scattered. Since scattered light is changed in transit direction, it is out of the light guide mode to be outputted to the outside, and the device becomes a light emitting state. That is, a light bulb can be achieved which is possible to turn on and off light by an electric field. In this case, since the output light is scattered light, an advantage of wide viewing angle is obtained.

In the present Embodiment 12, a reverse mode PDLC changing in scattering degree by an electric field is used as the thin film 150, however, the present invention is not limited to this, and one which changes in scattering degree by an electric field may be used and the same functions and effects of the present Embodiment are obtained using, for example, a Goldstone mode of a ferroelectric liquid crystal, a dynamic scattering mode by an ion flow or the like of a liquid crystal having a negative dielectric constant anisotropy, or even a thin film using a defect scattering mode in a cholesteric liquid crystal or the like. Further, an ordinary mode PDLC may be used Since, when a dielectric multilayered film is used as the reflection film 152, light of light guide mode can be reflected and other light transmitted, reflection of the dielectric multilayered film becomes invisible from the outside, thus providing superior characteristics.

(Embodiment 13)

Figure 16A:
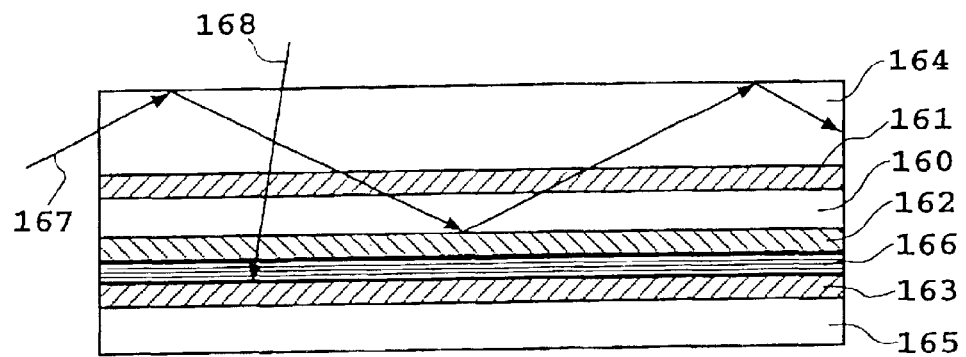
Figure 16B:
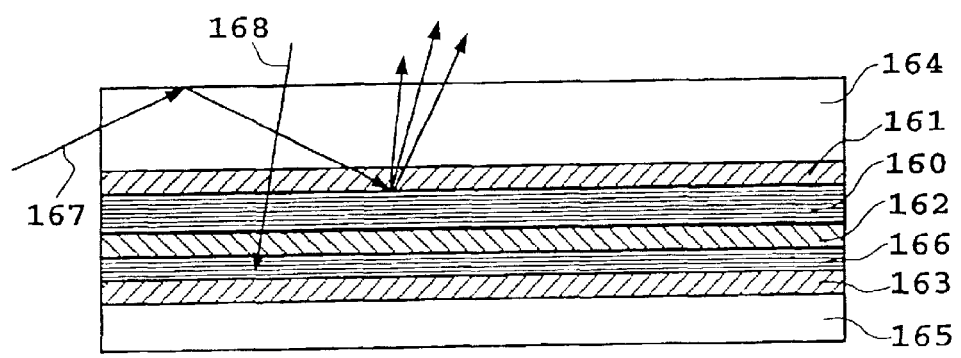

FIGS. 16A and 16B are side sectional diagrams schematically showing an embodiment of parallel reflection surface type optical device according to the present invention, in which FIG. 16A shows a case where a thin film (reverse mode PDLC) to be the optical control layer is in a transmission state, and FIG. 16B shows a case where a thin film (reverse mode PDLC) to be the optical control layer is in a scattering state. This embodiment has the same structure as the optical device of Embodiment 12 except that a light absorption layer is provided between a reflection film and a first electrode. That is, the optical device, as shown in FIGS. 16A and 16B, comprises a stacked structure having a thin film 160 to be an optical control layer, a transparent electrode 161 provided on the upper surface of the thin film 160, an electrode 163 provided on the lower surface of the optical control layer 160 through a reflection film 162 and the light absorption 166 provided on the lower surface of the reflection film 162, a light guide 164 provided on the upper surface of the transparent electrode 161, and a substrate 165 provided on the lower surface of the electrode 163.

The optical device of the present Embodiment 13 can be fabricated, for example, by a method in which a transparent electrode such as indium tin oxide is-shaped by deposition or the like on the light guide comprising highly transparent glass such as 7059 (from Corning (US)), and the surface of the transparent electrode is alignment processed by rubbing or the like. Further, a substrate such as glass provided thereon with an electrode such as an aluminum thin film or the like is spin coated with a resin or the like dispersed with, for example, a black pigment or the like to form a light absorption layer, on top of which a reflection film comprising a dielectric multilayered film is mounted by deposition or the like, and the surface thereof is alignment processed by rubbing or the like. The both components are opposed so that the alignment directions are antiparallel, a mixture of a liquid crystalline monomer and a liquid crystal is inserted in-between, and irradiated with UV-light.

In the optical device of the present Embodiment 13, since the thin film (reverse mode PDLC) 160 is in a transmission state when no electric field is applied, as shown in FIG. 16A, incident light 167 repeats reflections within the light guide area between the light guide 164 provided with the transparent electrode 161 and the thin film 160 and does not go to the outside, and the device is in a non-light-emitting state. Further, when an electric field is applied, since the thin film (reverse mode PDLC) becomes a scattering state, as shown in FIG. 16B, guided light is scattered. Since scattered light is changed in transit direction, it is out of the light guide mode to be outputted to the outside, and the device becomes a light emitting state. That is, a light bulb can be achieved which is possible to turn on and off light by an electric field. In this case, since the output light is scattered light, an advantage of wide visual angle is obtained.

In the present Embodiment 13, a reverse mode PDLC changing in scattering degree by an electric field is used as the thin film 160, however, the present invention is not limited to this, and one which changes in scattering degree by an electric field may be used and the same functions and effects of the present Embodiment 13 are obtained using, for example, a Goldstone mode of a ferroelectric liquid crystal, a dynamic scattering mode by an ion flow or the like of a liquid crystal having a negative dielectric constant anisotropy, or even a thin film using a defect scattering mode in a cholesteric liquid crystal or the like. Further, an ordinary mode PDLC may be used.

Still further, since, by changing the thickness of the dielectric multilayered film of the reflection film 162, waveguide mode light can be reflected and other light be transmitted, reflection of the dielectric multilayered film becomes invisible from the outside, thereby achieving improved characteristics.

Yet further, a low refractive index film of lower refractive index than the light guide 164 may be used as the reflection film 162. Since, in this case, the low refractive index film total-reflects guided light and acts to be transmissive to the sight 168 of the user, when viewed from the outside, only the color of the light absorption film 166 is visible during black color display, high-contrast display can be achieved. Yet further, reflection when viewed from the sight line side can be reduced.

(Embodiment 14)

This embodiment has the same structure as the optical device of Embodiment 12 or 13 except that a thin film with periodically distributed LC droplets is used as an optical control layer.

Figure 17A:
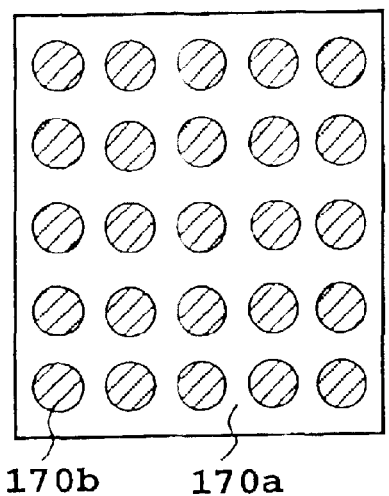
FIGS. 17A, 17B and 17C are schematic plane diagrams showing the structure of a thin film applied to the optical device according to the present invention.
Figure 17B:
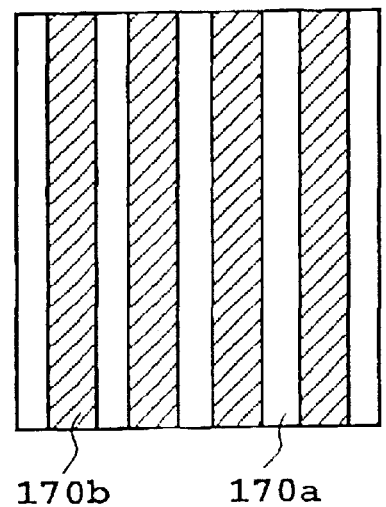
Figure 17C:
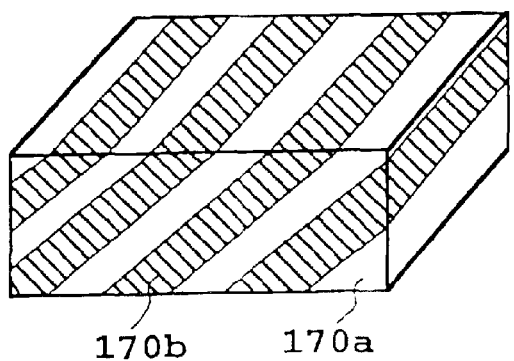

FIGS. 17A, 17B and 17C are schematic plane diagrams showing the structure of a thin film applied to the present embodiment. In this embodiment, as a thin film (the optical control layer) 150 or 160 (see FIG. 15A, 15B or FIG. 16A, 16B) of the optical device of Embodiment 12 or 13, a PDLC in which a liquid crystal 170b is distributed in the form of a diffraction grating in a transparent polymer resin 170a is used. Further, it is characterized in that diffraction efficiency of the PDLC is changed by an electric field.

Here, the PDLC indicates all types of composite thin films comprising the polymer resin 170a and the liquid crystal 170b, which may be a droplet type of LC droplet s distributed in the polymer resin 170a in which the polymer resin 170a is a continuous area, a polymer ball type in which both the polymer resin 173a and the liquid crystal 170b are continuous areas, or a discontinuous resin area type in which polymer resin particles are dispersed in the liquid crystal 170b.

As the PDLC, by using a reverse mode PDLC which is transmission state when no electric field is applied and scattering state when an electric field is applied, the response characteristic to electric field can be reversed, and light emission of electrode gap be prevented even if the electrode is divided.

In particular, when HPDLC is used, since it is a volume hologram, it is possible to make light emitting display with high color-purity light and with controlled directivity. Further, since directivity is high and light does not reach an unnecessary place, the image is high in brightness. Still further, since there is a wavelength selectivity, color display is possible. Yet further, glass is used as the light guide 154 or 164 (see FIG. 15A, 15B or FIG. 16A, 16B), however, alternatively, it may be a resin plate of acrylic resin or the like. By using a lightweight and inexpensive material such as acrylic resin as the light guide, a lightweight, inexpensive, thin-structured large-area display can be achieved.

(Embodiment 15)

Figure 18A:
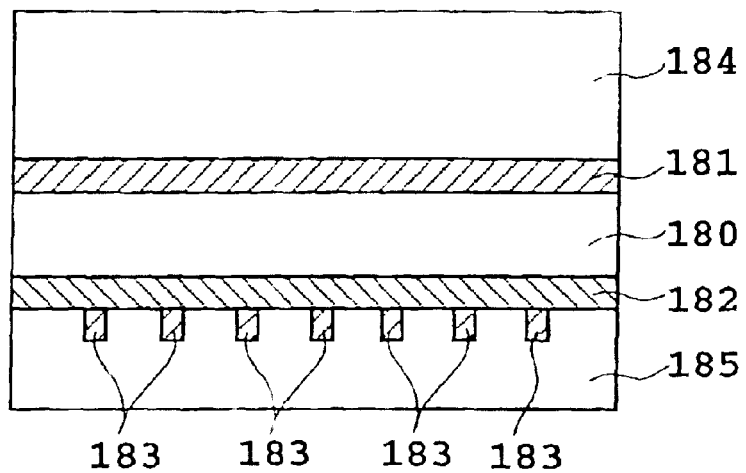
Figure 18B:
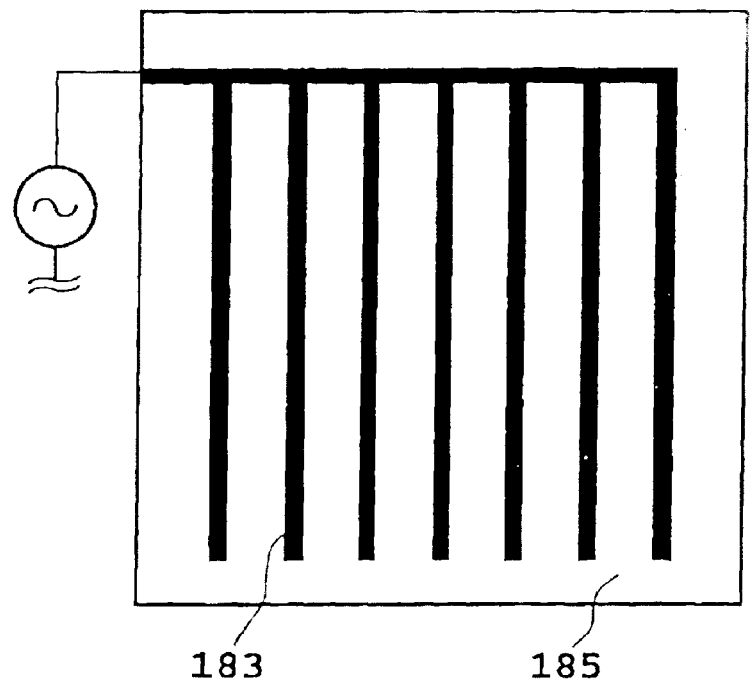

FIGS. 18A and 18B are diagrams schematically showing an embodiment of parallel reflection surface type optical device according to the present invention, in which FIG. 18A is a side sectional diagram of the optical device, and FIG. 18B is a plane diagram showing a comb-shaped electrode (hereinafter also referred to as periodic electrode)—which is formed on a substrate;

As shown in FIG. 18A, for example, a thin film 180 using a reverse mode PDLC changing in scattering degree by an electric field and a reflection film 182 are inserted between a substrate 185 provided with a periodic electrode 183 and the uniform transparent electrode 181, thereby driving the thin film 180. In this case, furthermore light guide 184 is provided on the transparent electrode 181. As shown in, FIG. 18B, the periodic electrode 183 having a fine periodic structure to an extent to be able to induce a fine periodic structure for diffracting light in the thin film.

Since, in the optical device of the present Embodiment 15, the thin film 180 is uniformly transmission state when no electric field is applied, guided light will never be outputted to the outside. Further, by applying an electric field across the periodic electrode 183 and the transparent electrode 181, since the area of the thin film 180 between the periodic electrode 183 and the transparent electrode 181 becomes scattering state, a periodic scattering area is-shaped. Since this causes the thin film 180 to be diffraction state, guided light is diffracted and outputted to the outside.

(Embodiment 16)

Figure 19A:
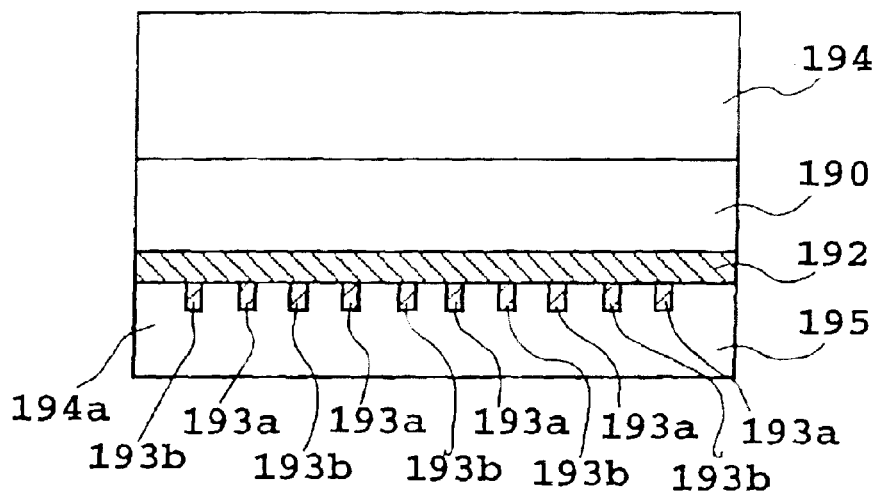
Figure 19B:
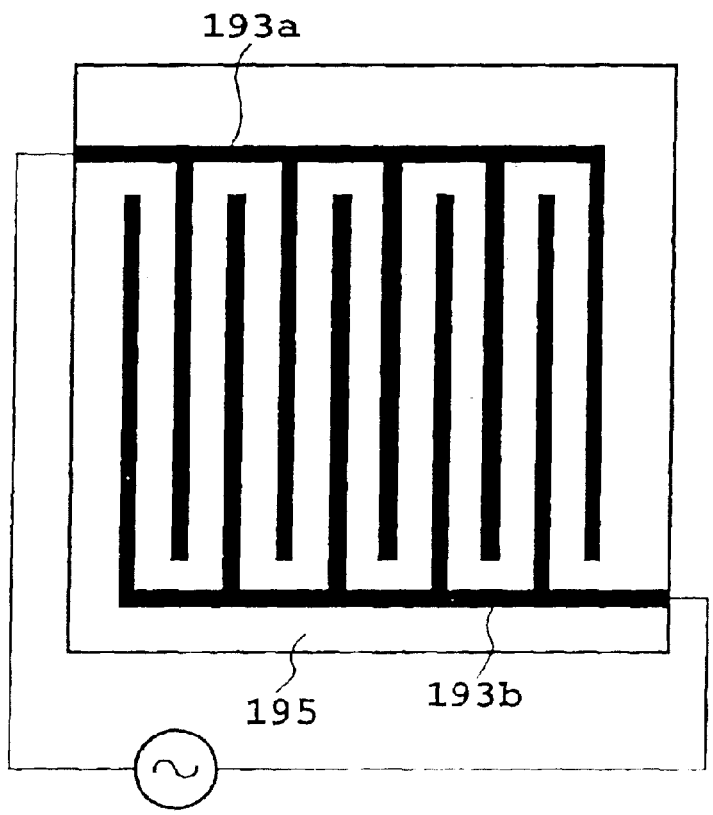

FIGS. 19A and 19B are diagrams schematically showing an embodiment of parallel reflection surface type optical device according to the present invention, in which FIG. 19A is a side sectional diagram of the optical device, and FIG. 19B is a plane diagram showing a comb-shaped electrode which is formed on a substrate;

As shown in FIG. 19A, the optical device comprises, for example, a thin film (the optical control layer) 190 using a reverse mode PDLC changing in scattering degree by an electric field, a light guide 194 and a reflection film 192 provided to sandwich the thin film 190, and a comb-shaped electrode which is formed on the substrate 195. Since, when no electric field is applied, the thin film 190 is uniformly in transmission state, guided light will never be outputted to the outside.

The comb-shaped electrode, as shown in FIG. 19B, has a first electrode 193a having a plurality of branches provided in the form of a comb on the substrate 195, and a second electrode 193b having a plurality of branches provided in the form of a comb on the substrate 195, and the first electrode 193a and the second electrode 193b are opposed on a same plane of the substrate so that the branches are disposed in alternation.

Since, by applying an electric field between the fine periodic electrodes 193a and 193b, an electric field parallel to the substrate 195 is generated between the fine periodic electrodes 193a and 193b, the area of the thin film between the fine periodic electrodes 193a and 193b becomes scattering state by the generated electric field, and a periodic scattering area is-shaped. Since, this makes the thin film 190 to be diffraction state, guided light is diffracted and outputted to the outside.

A reverse mode PDLC changing in scattering degree by an electric field is used as the thin film 190, however, the present invention is not limited to this, and one which changes in scattering degree by an electric field may be used.

Further, in addition to this, others can be used which change in refractive index or absorbance by an electric field, and the same functions and effects as in Embodiment 3 are obtained by using, for example, a uniformly aligned liquid crystal to change the refractive index, an electrochromic thin film, or a uniformly aligned guest host liquid crystal to change absorbance.

Still further, in Embodiment 15 and 16 same as in Embodiment 13, by disposing a light absorption film between the reflection film 182 and the periodic electrode 183, or between the reflection film 192 and 193a and 193b, it is possible to prevent the reflection film or the electrode from being visible from the user side.

Yet further, in Embodiments 15 and 16, when a dielectric multilayered film is used as the reflection film 182 or 192, since waveguide mode light can be reflected and other light be.transmitted, reflection of the dielectric multilayered film becomes invisible from the outside, thus providing improved characteristics. Yet further, when viewed from the outside, only the color of the light absorption film 7 is visible during black color display, high-contrast display can be achieved.

Yet further, a low refractive index film of lower refractive index than the light guide 2 may be used as the reflection film 182 or 192, and a light absorption layer be provided between the reflection film 182 and the periodic electrode 183, or between the reflection film 192 and the periodic electrodes 193a and 193b.

Since, in this case, the low refractive index film total-reflects guided light and acts to be transmissive to the sight line of the user, when viewed from the outside, only the color of the light absorption film is visible during black color display, high-contrast display can be achieved. Yet further, reflection when viewed from the sight line side can be reduced.

(Embodiment 17)

Figure 20A:
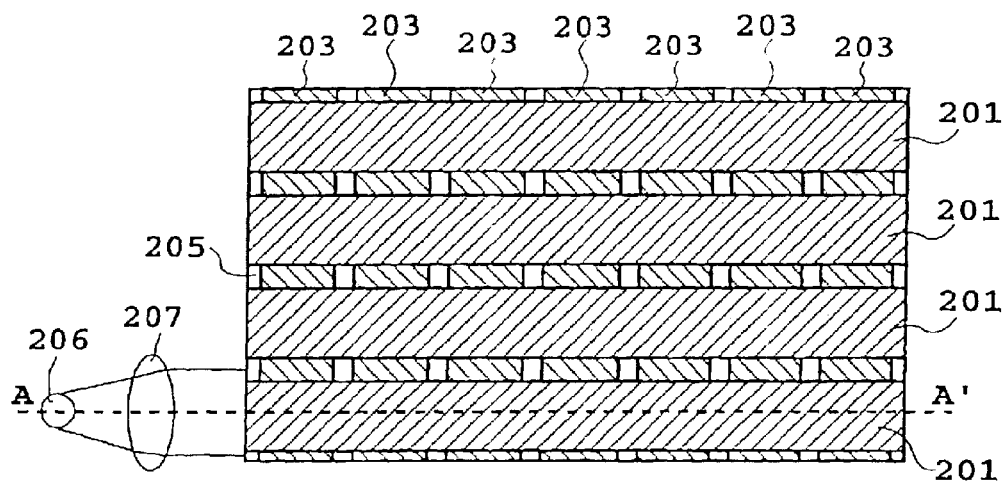
Figure 20B:
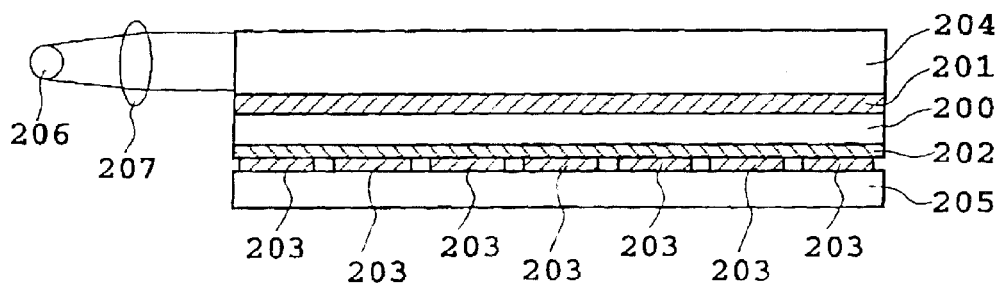

FIGS. 20A and 20B show an example of display apparatus according to the present invention, in which FIG. 20A is a plane diagram, and FIG. 20B is a sectional diagram taken along line A–A' in FIG. 20A;

This display apparatus has an optical device, illumination means for sending light to the optical device, and a power supply (not shown) for driving the optical device.

The optical device comprises an optical control layer 200, a plurality strip-shaped transparent electrodes 201 provided to be apart from and parallel to each other on the upper surface of the optical control layer 200, a plurality of strip-shaped electrodes 203 provided to be apart from each other and perpendicular to the transparent electrodes 201 on the lower surface of the optical control layer 200 through a reflection film 202, a light guide 204 provided on the upper surface of the strip-shaped transparent electrodes 201, and a substrate 205 provided on the lower surface of the strip-shaped transparent electrodes 204. In the present embodiment, the optical control layer 200 comprises a holographic PDLC.

The illumination means is to apply light from an end surface of the light guide 204, and has an light source 206 and a lens 207 for focusing light from the light source 206 onto the end surface. Of all the end surfaces of the light guide, parts other than inputted with focused light may be deposited with metal films or the like for reflecting light.

The power supply applies an electric field to the optical device by connecting the strip-shaped electrodes 201 and 203.

Figure 21A:
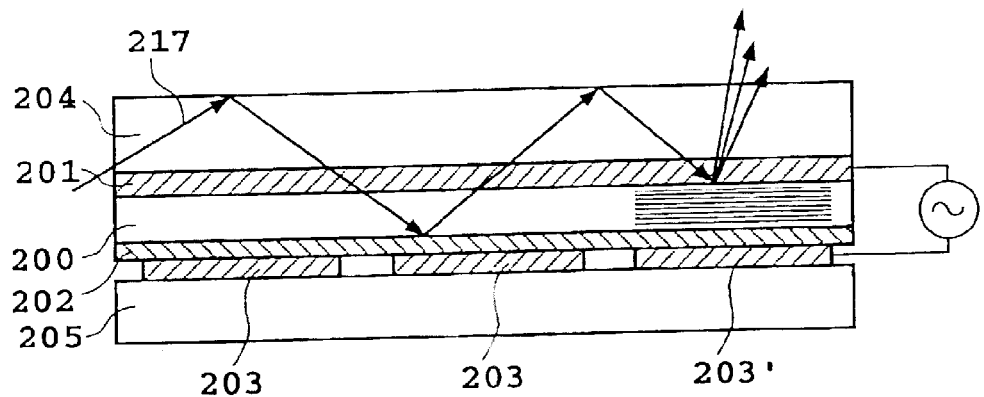
FIGS. 21A and 21B are sectional diagrams showing operation of an example of display apparatus according to the present invention.
Figure 21B:
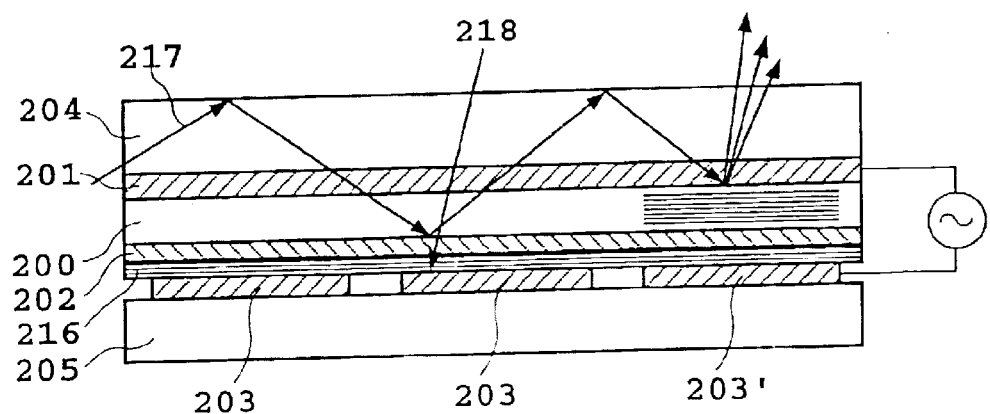

FIGS. 21A and 21B are diagrams for explaining operation of the display apparatus of Embodiment 17.

As shown in FIGS. 21A and 21B, since the holographic PDLC between the transparent electrode 201 and the electrode 203 applied with no voltage is transmission state, incident light 217 is guided within the light guide area of the light guide 204 provided with the transparent electrode 201 and the optical control layer 200, and therefore does not emit light.

When a voltage is applied between the transparent electrodes 201 and the perpendicular strip-shaped electrodes, the holographic PDLC at the cross point of the transparent electrode 201 and the voltage-applied electrode 203 becomes a diffraction state and emits light. Therefore, by scanning the electrodes, an optional bit map image can be displayed.

In the present Embodiment 17, a holographic PDLC is used for the optical control layer 200, however, in addition to this, those which change in optical properties such as refractive index, scattering degree, or absorbance by an electric field as described in the above embodiments (for example, a reverse mode PDLC and the like) can be used. When a reverse mode PDLC is used in the optical control layer 200, the electrode gap does not emit light, and high-contrast display is thus possible.

Further, as shown in FIG. 21B, by providing a light absorption film 216 between the reflection film 202 and the electrode 203, the reflection film and electrode can be prevented from being visible from the user side. Still further, when viewed from the outside, since only the color of the light absorption film 216 is visible during black color display, high-contrast display can be achieved.

Since, when a dielectric multilayered film is used as the reflection film 202, light of waveguide mode can be reflected and other light transmitted, reflection of the dielectric multilayered film becomes invisible from the outside, thus providing improved characteristics.

A low refractive index film of lower refractive index than the light guide may be used as the reflection film 202, and the light absorption film 216 be provided between the reflection film and the electrode 203. Since, in this case, the low refractive index film total-reflects guided light and acts to be. transmissive to the sight line of the user, when viewed from the user side 218, only the color of the light absorption film 216 is visible during black color display, high-contrast display can be achieved. Further, either of the transparent electrodes 211 or the electrodes 203 may be divided into display pixel units, and each of the divided display pixel unit be provided with a switching device.

As another aspect of the present embodiment, a comb-shaped electrode can be used in place of the strip-shaped transparent electrodes as described in Embodiment 8. This case also provides the above-described effects.

(Embodiment 18)

Figure 22:
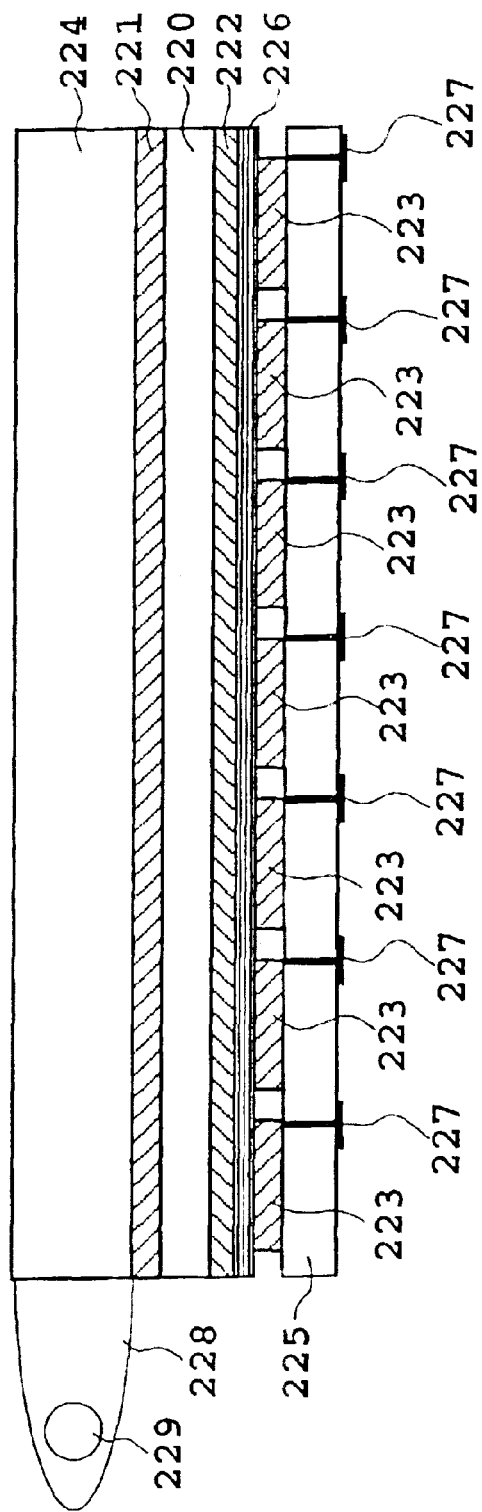
FIG. 22 is a sectional diagram showing an example of display apparatus according to the present invention.

FIG. 22 shows an example of display apparatus according to the present embodiment, which differs from the display apparatus constructed in Embodiment 17 in the wiring method and illumination means. The optical device forming the display apparatus is stacked in the same stacking order as in Embodiment 17 except for the following points. That is, in the optical device applied to the present embodiment, as shown in FIG. 22, by providing fine holes in a substrate 225 and filling the inside of the hole with an electroconductive material such as metals, a backside electrode 227 penetrating to the lower part of the substrate 225 and connected to each of strip-shaped electrodes 223 can be taken out. The strip-shaped electrodes 223 and backside electrodes have a 1:1 correspondence relation. Further, the illumination means, as shown in FIG. 22, comprises a reflection plate 228 and an illumination 229 surrounded by the reflection plate, and is provided on an edge of a light guide 224.

Other construction is the same as in Embodiment 17. That is, the optical device comprises an optical control layer 220, a plurality of strip-shaped transparent electrodes 221 provided to be apart from and parallel to each other on the upper surface of the optical control layer 220, a reflection layer 222 and further a plurality of strip-shaped electrodes 223 provided on the lower surface of the optical control layer 220 through a light absorption film 226, the light guide 224 provided on the upper surface of the strip-shaped transparent electrodes 221, and a substrate 225 provided on the lower surface of the strip-shaped transparent electrodes 223. The plurality of strip-shaped electrodes 223 are provided to be apart from each other and further to be perpendicular to the strip-shaped transparent electrodes 221.

With the construction as in the present Embodiment 18, a thin-structured, large-area, and high-resolution display apparatus can be achieved. Further, a drive circuit can be mounted on the backside, so that a low-profile display apparatus including the driving portion can be realized. To be precise, for example, a driving driver IC is surface-mounted on a surface opposite to the optical control side of the substrate by means of a soldered connection or the like. In this case, the substrate with a through hole is-shaped using a glass epoxy resin which is used as a material of a printed board in general. Thus, an electrode can be arranged through the substrate via a through hole, so that a low-profile display apparatus including the driving portion can be realized. In addition, a packing density can be also increased by mounting a driver IC on a flexible print substrate (FPC) and bonding them together-with an anisotropic conductive material (e.g., anisotropic conductive film such as AC-7144 available from Hitachi Chemical Co., Ltd.).

Still further, by changing the illumination method, a compact and efficient display apparatus can be achieved as compared with the above Embodiment 17. In the present Embodiment 18, the light guide is in the form of a plate, however, alternatively, by using a curved surface, a display apparatus of columnar form, spherical form or the like can be achieved.

As another aspect of the present embodiment, as shown in Embodiments 9 and 10, the display apparatus of a type in which the electrode provided on the lower surface of the optical control layer is divided into display pixel units can also be driven from the backside. In this case, the same effects as the present embodiment are obtained.

(Embodiment 19)

Figure 23:
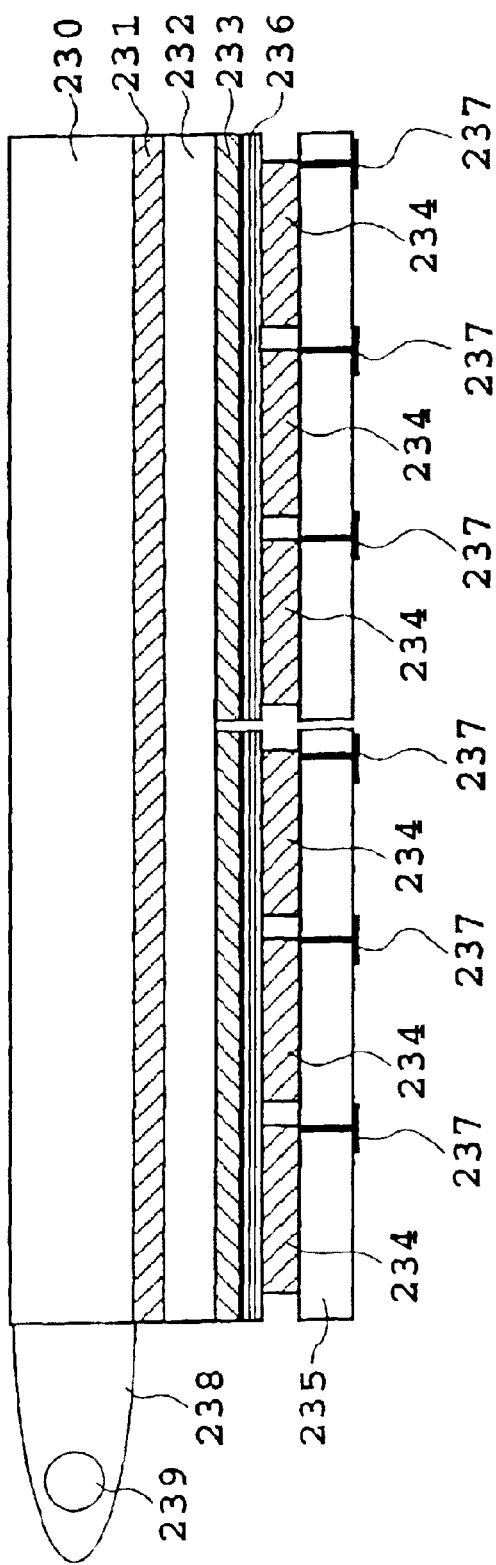
FIG. 23 is a sectional diagram showing an example of display apparatus according to the present invention.

FIG. 23 shows an example of display apparatus according to the present invention, which is constructed same as in Embodiment 18 except that the substrate is divided. That is, the stacking areas from the light guide to the optical control layer are integrated, and the substrate is divided and arranged in the form of tiles.

As shown in FIG. 23, the optical device applied to the display apparatus has a light guide 230, a plurality of strip-shaped transparent electrodes 231 provided to be apart from and parallel to each other on the lower surface of the light guide 230, integrated with an optical control layer 232 provided on the lower surface of the strip-shaped transparent. electrodes 231. However, the present embodiment has a structure in which the lower surface of the light absorption film 232 is stacked with every divided substrate.

secifically, as shown in FIG. 23, the optical device comprises a reflection film 233 provided on the lower surface of the optical control layer 232, a light absorption film 234 provided on the lower surface of the reflection film 233, strip-shaped transparent electrodes 234 provided to be apart from each other and further to be perpendicular to the strip-shaped transparent electrodes 231 on the lower surface of the light absorption film 236, and a substrate 235 provided on the lower surface of the strip-shaped transparent electrodes 234. Further, the illumination means, as shown in FIG. 23, comprises a reflection plate 238 and an illumination 239 surrounded by the reflection plate, and is provided on an edge of a light guide 230.

By providing fine holes in the substrate 235 and filling the inside of the holes with an electroconductive material such as metals, a backside electrode 237 penetrating the substrate 235 and connected with the transparent electrode 234 on the substrate 235 can be taken out to the lower side of the substrate. As a result, an area for wiring is needless on the periphery of the substrate. Therefore, the divided substrate 235 can be arranged in the form of tiles compactly, thereby facilitating construction of a large-area screen. For this reason, for a substrate which requires fine processing and is difficult to construct a large-area apparatus while preventing uneven quality due to dividing work in the optical control layer, processing can be completed in a small area. Further, in the construction of a large-area apparatus, joint lines can be made invisible by using a common light guide.

FIG. 23 exemplifies a case where the substrate 236 is divided into two parts, however, the type of division can be changed as necessary. Further, by using a PDLC having an adhesiveness such as a reverse mode PDLC as the optical control layer, the divided substrates can be bonded and arranged in the form of tiles. By bonding and arranging in the form of tiles, the substrates are fixed and become hard to be displaced.

As another aspect of the present embodiment, also for the display apparatus of a type where the electrode provided on the lower surface of the optical control layer is divided into display pixel units as shown in Embodiments 9 and 10, it is possible to arrange the drive substrates in the form of tiles. Also in this case, the same effects as in the present embodiment are obtained.

In the present invention, as described above, the light guide is shaped like a plate having parallel surfaces for the purpose of minimizing losses produced by a leakage of light. Alternatively, the light guide may be shaped like a plate having a gently curved or spherical surface. Thus, a display apparatus in the form of cylinder, sphere, or the like may be prepared by providing an electrode on a flexible substrate and then bonding the obtained laminate to a light guide in the form of a spherical transparent plate.

Furthermore, in the present invention, the illumination means may have a red light source, a blue light source, and a green light source, and further comprising means for successively switching said red light source, blue light source and green light source in synchronization with display image.

The present invention has been described in detail with respect to various embodiments, and it will now be apparent from the foregoing to those skilled in the art that changes and modifications may be made without departing from the invention in its broader aspects, it is the invention, therefore, in the appended claims to cover all such changes and modifications as fall within the true spirit of the invention.

What is claimed is:

1. An optical device comprising a light transmissive plate-shaped light guide for guiding light incident from an end surface, an optical control layer provided on a lower surface of said plate-shaped light guide through a transparent electrode provided as a first electrode, a reflection film provided on a lower surface of said optical control layer, a second electrode provided on a lower surface of said reflection film, and a substrate provided on a lower surface of said second electrode, wherein said optical control layer changes in diffraction efficiency by an electric field applied by said first electrode and said second electrode.

2. The optical device as claimed in claim 1, further comprising a light absorption film disposed between said reflection film and said second electrode.

3. The optical device as claimed in claim 1, wherein at least one of said first electrode and said second electrode comprises an electrode group divided into strips, when both of said first electrode and said second electrode comprise electrode groups divided into strips, said plurality of strip-formed electrodes constituting said first electrode and said plurality of strip-formed electrodes constituting said second electrodes are disposed to be perpendicular to each other.

4. The optical device as claimed in claim 1, wherein at least one of said first electrode and said second electrode is divided into display pixel units, and each of said divided display pixel units has a switching device.

5. The optical device as claimed in claim 1, wherein said optical control layer is made of a reverse mode polymer dispersed liquid crystal which is constructed by dispersing a low molecular-weight liquid crystal in a liquid crystalline polymer, and said optical control layer becomes a uniform birefringent thin film when no electric field is applied and becomes a scattering state when an electric field is applied.

6. The optical device as claimed in claim 1, wherein said optical control layer comprises one of constructions of liquid crystal particles dispersed in a polymer resin area, a polymer dispersed liquid crystal comprising polymer resin particles dispersed in a liquid crystal, and a polymer dispersed liquid crystal in which respective polymer resin area and liquid crystal area form continuous areas.

7. The optical device as claimed in claim 1, wherein said reflection film comprises one selected from:

a dielectric multilayered film; and a film lower in refractive index than said light guide.

8. A display apparatus comprising an optical device and a illumination means for applying light to said optical device, said optical device having an end surface for incident light from said illumination means, a light transmissive plate-shaped light guide for guiding incident light, an optical control layer provided on a lower surface of said light guide through a transparent electrode provided as a first electrode, a reflection film provided on a lower surface of said optical control layer, a second electrode provided on a lower surface of said reflection film, and a substrate provided on a lower surface of said second electrode, wherein said optical control layer changes in diffraction efficiency by an electric field applied by said first electrode and said second electrode.

9. The display apparatus as claimed in claim 8, further comprising a light absorption film disposed between said reflection film and said second electrode.

10. The optical device as claimed in claim 8, wherein at least one of said first electrode and said second electrode comprises an electrode and said second electrode comprises and electrode group divided into strips, when both of said first electrode and said second electrode comprise electrode groups divided into strips, said plurality of strip-formed electrodes constituting said first electrode and said plurality of strip-formed electrodes constituting said second electrodes are disposed to be perpendicular to each other.

11. The display apparatus as claimed in claim 8, wherein at least one of said first electrode and said second electrode is divided into display pixel units, and each of said divided display pixel units has a switching device.

12. The display apparatus as claimed in claim 8, wherein said optical control layer is made of a reverse mode polymer dispersed liquid crystal which is constructed by dispersing a low molecular-weight liquid crystal in a liquid crystalline polymer, and said optical control layer becomes a uniform birefringent thin film when no electric field is applied and becomes a scattering state when an electric field is applied.

13. The display apparatus as claimed in claim 8, wherein said optical control layer comprises one of constructions of liquid crystal particles dispersed in a polymer resin area, a polymer dispersed liquid crystal comprising polymer resin particles dispersed in a liquid crystal, and a polymer dispersed liquid crystal in which respective polymer resin area and liquid crystal area form continuous areas.

14. The display apparatus as claimed in claim 8, wherein said reflection film comprises one selected from a dielectric multilayered film and a film lower in refractive index than said light guide.

15. The display apparatus as claimed in claim 8, wherein said illumination means has at least a red light source, a blue light source, and a green light source, and further comprising means for successively switching said red light source, blue light source and green light source in synchronization with display image.

16. An optical device comprising a light transmissive plate-shaped light guide for guiding light incident from an end surface, an optical control layer provided on a lower surface of said plate-shaped light guide through a transparent electrode provided as a first electrode, a reflection film provided on a lower surface of said optical control layer, a second electrode provided on a lower surface of said reflection film, and a substrate provided on a lower surface of said second electrode, wherein said optical control layer changes in scattering degree or diffraction efficiency by an electric field applied by said first electrode and said second electrode, and wherein said optical control layer comprises a holographic polymer dispersed liquid crystal having a structure periodically distributed in the form of a diffraction grating.

17. A display apparatus comprising an optical device and an illumination means for applying light to said optical device, said optical device having an end surface for incident light from said illumination means, a light transmissive plate-shaped light guide for guiding incident light, an optical control layer provided on a lower surface of said light guide through a transparent electrode provided as a first electrode, a reflection film provided on a lower surface of said optical control layer, a second electrode provided on a lower surface of said reflection film, and a substrate provided on a lower surface of said second electrode, wherein said optical control layer changes in scattering degree or diffraction efficiency by an electric field applied by said first electrode and said second electrode, and wherein said optical control layer comprises a holographic polymer dispersed liquid crystal having a structure periodically distributed in the form of a diffraction grating.

* * * * *